(12) United States Patent
Hamera

(10) Patent No.: US 11,954,672 B1
(45) Date of Patent: Apr. 9, 2024

(54) SYSTEMS AND METHODS FOR CRYPTOCURRENCY POOL MANAGEMENT

(71) Applicant: Coinbase, Inc., San Francisco, CA (US)

(72) Inventor: Paul Hamera, San Francisco, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 17/385,533

(22) Filed: Jul. 26, 2021

Related U.S. Application Data

(60) Provisional application No. 63/127,898, filed on Dec. 18, 2020, provisional application No. 63/056,878, filed on Jul. 27, 2020.

(51) Int. Cl.
*G06Q 20/36* (2012.01)
*G06Q 20/38* (2012.01)
*H04L 9/14* (2006.01)
*H04L 9/32* (2006.01)

(52) U.S. Cl.
CPC ..... *G06Q 20/3674* (2013.01); *G06Q 20/3678* (2013.01); *G06Q 20/3825* (2013.01); *G06Q 20/3829* (2013.01); *G06Q 20/389* (2013.01); *H04L 9/14* (2013.01); *H04L 9/3239* (2013.01); *H04L 2209/56* (2013.01)

(58) Field of Classification Search
CPC .......... G06Q 20/3674; G06Q 20/3678; G06Q 20/3825; G06Q 20/3829; G06Q 20/389; H04L 9/14; H04L 9/3239; H04L 2209/56
See application file for complete search history.

(56) References Cited

U.S. PATENT DOCUMENTS

| | | |
|---|---|---|
| 10,033,702 B2 | 7/2018 | Ford et al. |
| 10,790,976 B1 * | 9/2020 | Raevsky .............. G06Q 20/065 |
| 11,282,139 B1 | 3/2022 | Winklevoss et al. |
| 11,315,122 B2 | 4/2022 | Zhuang et al. |
| 11,451,387 B2 | 9/2022 | Daniel et al. |
| 11,544,701 B2 | 1/2023 | Anton et al. |
| 2019/0228386 A1 * | 7/2019 | Onnainty .............. H04L 9/0643 |
| 2020/0145227 A1 * | 5/2020 | Pachler ................ H04L 9/3242 |

* cited by examiner

*Primary Examiner* — Jacob C. Coppola
*Assistant Examiner* — Christine Dang
(74) *Attorney, Agent, or Firm* — Perkins Coie LLP

(57) ABSTRACT

A multitenant custodial wallet that provides users with a flexible primitive for managing discrete sets of cryptographic keys to interact with one or more blockchain protocols. By recognizing a pool primitive (e.g., pool object), a wallet can manage a set of keys as a single pool, in addition to managing keys individually.

20 Claims, 16 Drawing Sheets

Pool configuration
PoolID

| administrative permissions | |
|---|---|
| permission | account |
| access | entity1 or entity2 |
| edit configurations | entity2 |
| allocate key | entity2 |
| allocate address | entity3 |
| delete key | entity2 & entity3 | key configuration

| key | key store | curve | key use policy |
|---|---|---|---|
| key1 | KMS1 | curve1 | fcn1, fcn2 |
| key2 | KMS2 | curve1 | fcn1, fcn2, fcn3 |
| key3 | KMS1 | curve2 | fcn5 |
| ... | ... | ... | ... |
| keyn | KMSn | curven | fcn2, fcn4 | address configuration

| key | key | network | address use policy |
|---|---|---|---|
| key1 | key1 | ntwk1 | fcn1 |
| key2 | key2 | ntwk1 | fcn1, fcn2, fcn3 |
| key3 | key1 | ntwk2 | fcn2 |
| ... | ... | ... | ... |
| keyn | KMSn | ntwkn | fcn2, fcn4 |

*FIGURE 4A*

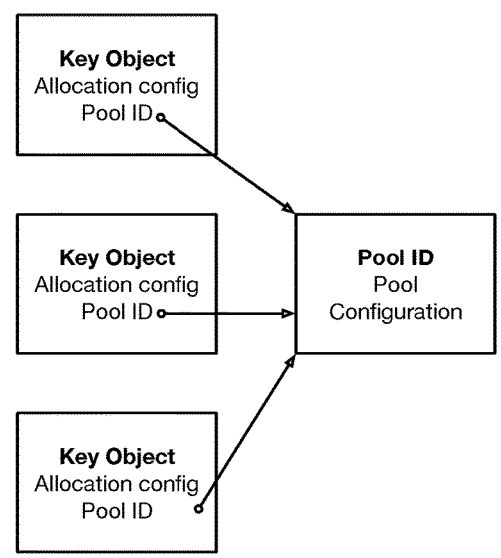

*FIGURE 4B*

| key use policy | |
|---|---|
| Functionality | Keys |
| signing | key1, key2 |
| deposit | key2, key 3, key4 |
| smart contract deposit | key2, key 5 |
| ... | ... |
| smart contract burn | keyn |

FIGURE 5

SYSTEMS AND METHODS FOR CRYPTOCURRENCY POOL MANAGEMENT

CROSS-REFERENCE TO RELATED APPLICATIONS

This application claims the benefit of U.S. Provisional Application No. 63/056,878 filed 27 Jul. 2020 and U.S. Provisional Application No. 63/127,898 filed 18 Dec. 2020, each of which is incorporated in its entirety by this reference.

TECHNICAL FIELD

This disclosure relates generally to the blockchain field, and more specifically to a new and useful system and method for managing cryptographic keys.

BRIEF DESCRIPTION OF THE FIGURES

FIG. 4A is a schematic representation of an example pool configuration.

FIG. 4B is a schematic representation of key association with a pool.

FIG. 5 is a schematic representation of an example key use policy.

DETAILED DESCRIPTION

The following description of the embodiments is not intended to limit the disclosure to these embodiments, but rather to enable any person skilled in the art to make and use the embodiments disclosed herein.

1. Overview.

The system and method described herein provides a multitenant custodial wallet that provides users with a flexible primitive for managing discrete sets of cryptographic keys to interact with one or more blockchain protocols. By recognizing a pool primitive (e.g., pool object), a wallet can manage a set of keys as a single pool, in addition to managing keys individually.

Figure 1A:
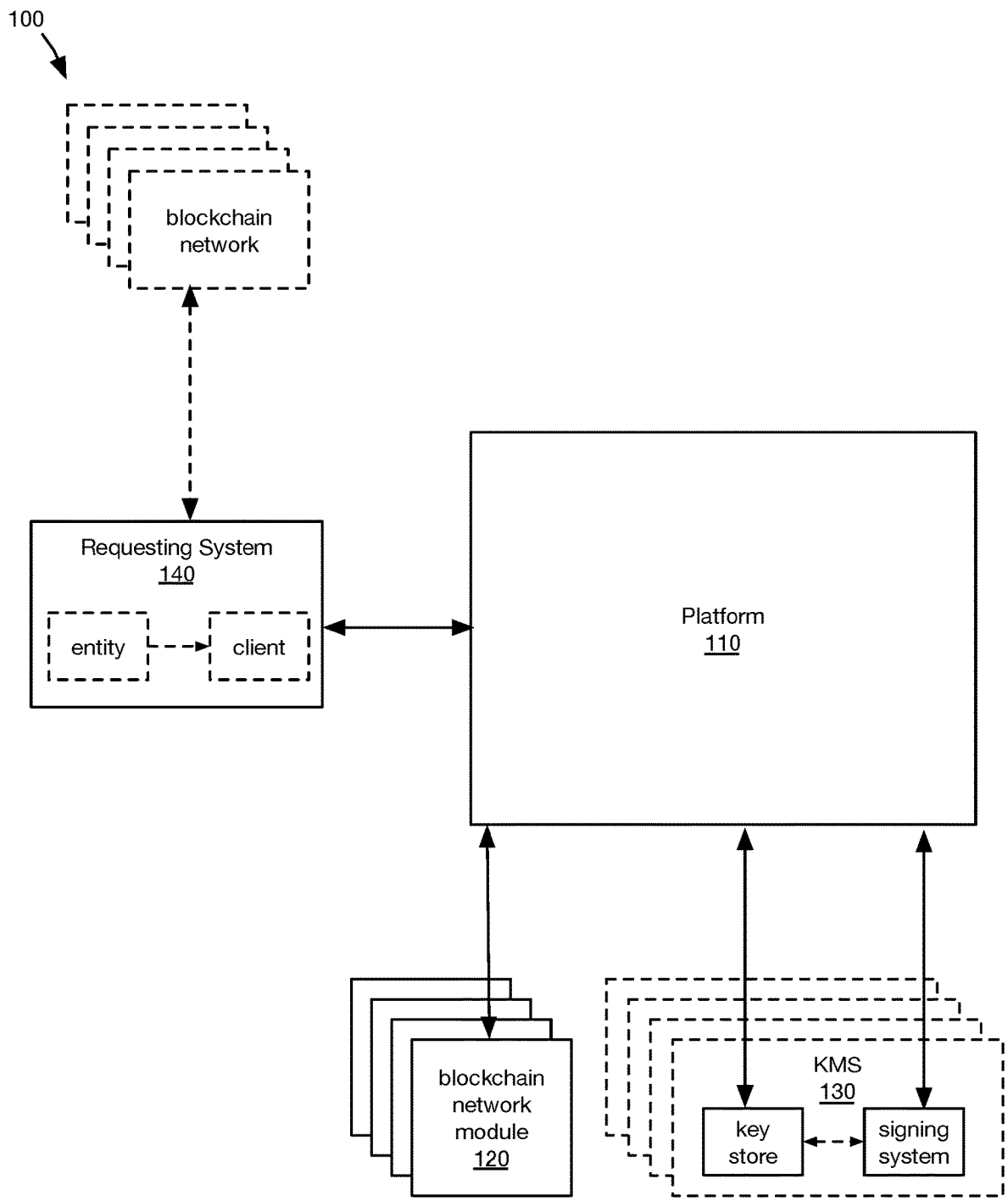
FIG. 1A is a schematic representation of a variant of the system.

As shown in FIG. 1A, the system can include a platform 110 that is optionally coupled to one or more blockchain network modules 120 and key management systems 130. The platform functions to process requests received from a requesting system 140.

2. Benefits.

Variants of the technology can confer several benefits over conventional systems and methods.

First, variants of the technology can isolate keys by virtue of allocating cryptographic keys to pools. For example, assets held by keys in a first pool can be isolated from assets held by keys in another pool—keys in different pools can be physically segregated, segregated by access, segregated by control, segregated by software, segregated by database, segregated by jurisdiction, or otherwise segregated. Moreover, each pool can be associated with a set of authentication, authorization, and/or other key management conditions (e.g., regulatory restrictions, user policies), wherein one or more components of the platform can manage keys for each pool in accordance with respective key management conditions.

Second, variants of the technology provide a single, blockchain network-agnostic interface by automatically determining the relevant key, key parameters, and key management system for each request. This can enable a single client to sign different messages using different keys and key management systems. This can also relieve the client from tracking which keys should be used for a given blockchain functionality (e.g., send, receive, delegate, smart contract interactions, etc.) blockchain behavior, or blockchain interaction (wherein descriptions referring to "blockchain functionality" can be equally applied to "blockchain behavior" or "blockchain interaction" herein), since the key-to-functionality mapping can be specified by the respective pool's configuration. This can also relieve a user from interacting with individual keys. For example, system can track an aggregate balance of all addresses controlled by a pool of keys managed by the wallet, in addition to a balance for each key.

Third, variants of the technology can be more scalable than conventional wallets, because the clients no longer need to track the key identifiers and other signing parameters (e.g., curve type, key management system, etc.). Instead, the clients can simply track the pool identifiers, wherein the system can automatically determine all relevant parameters based on the configurations associated with the pool identifier. This also allows new blockchains, key management systems, key types, and clients to be easily added or changed at a single endpoint, instead of individually propagating the change throughout all serviced clients. Variants of the technology can be more scalable (and/or less computing resource intensive) because underlying systems (e.g., KMSs, signing systems, etc.) can be shared across pools.

Fourth, variants of the technology can confer additional security by enforcing an additional authorization layer. For example, the system can selectively authorize client access to pool information based on credentials or lists (e.g., whitelists or blacklists).

Fifth, variants of the technology can confer additional security by custodying the keys (e.g., storing the keys on behalf of users), and enabling use of various types of key storage schemes, such as cold storage and hot storage.

Further benefits are provided by the systems and methods disclosed herein.

3. System.

As shown in FIG. 1A, the system can include a platform 110 that is optionally coupled to one or more blockchain network modules 120, key management systems 130, requesting systems 140, and/or other components.

Communication between system components can be secured (e.g., encrypted), require authentication or authorization (e.g., using logins, API tokens, credentials, etc.), and/or otherwise managed.

3.1 Blockchain Networks

The system can be used with one or more blockchain networks. The blockchain networks can have the same or different blockchain protocol. The blockchain networks can include: UTXO-based blockchains, account-based blockchains, and/or any other suitable blockchain. Examples of blockchains that can be used include: Bitcoin, Ethereum, Cardano, EOS, IOTA, Komodo, Tezos, and/or blockchains. The blockchain networks can include: mainnets, testnets, forks, and/or other network types. Examples of blockchain networks can include: bitcoin-mainnet, tezos-mainnet, iota-testnet, and/or other networks. The system can interact with the blockchain networks via: a set of blockchain nodes, each synchronized with a different blockchain network; the requesting system, wherein the requesting system broadcasts signed messages to the respective blockchain and reads blockchain information; and/or via any other suitable system.

3.2 Requesting Systems.

The system can be used by one or more requesting systems 140 (e.g., tenants). The requesting systems are preferably internal services of the platform (e.g., clients), but can alternatively be an entity, a user, or other endpoint (or system thereof). Each entity can be associated with a set of user accounts, wherein different user accounts of an entity can have the same or different pool privileges. The requesting system can be associated with: an identifier (e.g., username, user account, API token, etc.), authentication credentials, a set of pools (e.g., that the requesting system is authorized to access), a set of key stores, a set of signing systems, a set of KMSs, and/or other information or components. The requesting systems can: store pool identifiers (e.g., for the pools that they're authorized for), store key information, store authentication information, store authorization information, interface with users, generate requests for messages (e.g., generate a subset of information for a blockchain message, generate unsigned messages, generate unsigned transactions, etc.), broadcast signed messages to blockchains, store partially signed messages, and/or perform other functionalities. Examples of requesting systems can include: digital wallets, user devices, decentralized applications (dApps), hardware wallets, and/or any other suitable requesting system. Each requesting system can be associated with one or more blockchain functionalities. In a first example, a given requesting system (e.g., entity, client) is always associated with a specific blockchain functionality (e.g., a Delegation or Withdrawals client is always associated with a signing functionality). In a second example, a requesting system provides a blockchain functionality identifier with the request to the system (e.g., a Payments client can specify whether the request is for a deposit or withdrawal).

3.3 Keys.

The system can be used with one or more keys. The keys are preferably the private keys of an asymmetric keypair, but can additionally or alternatively include the public key, a symmetric key, and/or other keys. Alternatively, the system can be used to secure other sensitive information.

The keys are preferably generated by the key store (e.g., the key store that they are stored in), but can alternatively be received from a requesting system, or generated by another system, or otherwise determined. The keys can be generated based on a set of key configuration parameters. The configuration parameters can be: specified in a key generation request, in an allocation configuration (e.g., a template, identified by an allocation configuration identifier), automatically specified, and/or otherwise specified. The configuration parameters can include: a key management system identifier or key store identifier (e.g., identifying the KMS or key store to store the resultant key), the curve used to derive the key, the blockchain network(s) that the key is to be used with, a nonce, metadata from the blockchain network(s), and/or any other suitable information needed to derive the key.

The keys are preferably stored (e.g., in encrypted or cleartext format) in one or more key stores (example shown in FIG. 3), but can additionally or alternatively be stored by a KMS, the registry database, the pools database, and/or any other suitable component. Key information can be stored in a separate database from the key store, such as the registry database, pools database, a key database, or other database, or be stored in the key store. Key information can include: the key identifier for the private key (e.g., external key identifier, KMS key identifier); the public key; one or more addresses associated with the key (e.g., derived from the key, controlled by the key); the balance for each key; the key history; the key age; and/or any other suitable information. Key information is preferably provided to requesting services that are authorized to access the pool and/or the key information for the specific key (e.g., responsive to a request for the key information), but can be provided to other requesting services.

3.4 Addresses.

Figure 3:
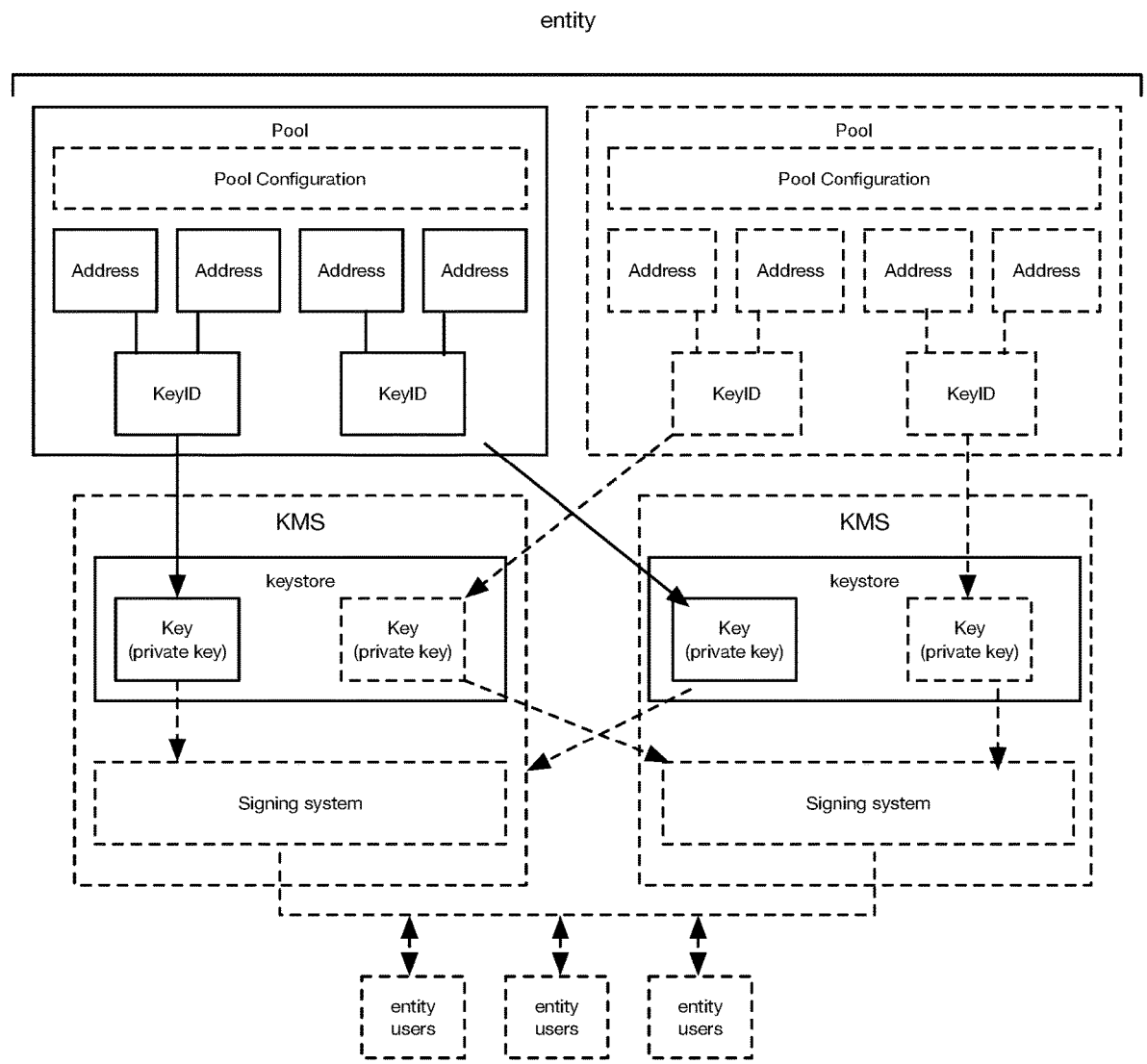
FIG. 3 is a schematic representation of an example of the pools, keys, and addresses associated with an entity, and the respective associations with other system components.

The system can be used with one or more addresses (example shown in FIG. 3). The addresses are preferably cryptographic addresses, but can be other addresses. The addresses are preferably derived from the keys, but can be otherwise generated. The addresses are preferably derived by the network module (e.g., specific to the blockchain network that the address is used for), but can alternatively be derived by the key store or KMS storing the key, the blockchain, the registry, or by another system; received from a requesting system; and/or otherwise determined. The addresses can be generated based on a set of address configuration parameters. The address configuration parameters can include: a key identifier, an identifier for the blockchain network, nonce, metadata, and/or any other suitable information needed to derive an address. The addresses can be stored with the key, stored by the respective pool configuration, by an address database, by the registry database, and/or any other suitable system.

3.5 Pools.

The system can be used with one or more pools (example shown in FIG. 3), which can be used as the context in which the behavior of the various modules or components that make up the wallet are configured. As an example, one user or product may prefer to receive deposits into a cold key system for a pool they operate, whereas another may prefer to receive deposits into a hot key system. The module responsible for handling the deposit functionality can be configured at the pool level to exhibit this type of behavior. In variants, the different key management systems used by the pools can be configured for each individual pool. Configuration may also be utilized to express access controls and authorization for different functions for operating a pool.

Pools preferably function as key segregation constructs (e.g., define a logical grouping of keys, define a logical grouping of policies, etc.), but can be otherwise used. A pool can be a namespace for resources (e.g., Keys, Addresses, etc.), a container for resources, and/or define any other suitable data construct. The pools can be segregated by: entity, geography (e.g., of the keys' beneficial owners), blockchain, blockchain network, cryptocurrency, client, access, control, physical location, and/or otherwise segregated.

A pool can be associated with (or include): a key set, a pool configuration, a set of addresses controlled by said keys, and/or other information. Additionally or alternatively, a pool can logically segregate other resources, such as secrets, logins, entity data, and/or other data, in lieu of keys. The pool can be represented by a pool object, a pool identifier, and/or otherwise represented. Each pool can interact with one or more key management systems, and each key management system can service one or more pools. Each requesting system can be associated with (e.g., be authorized to interact with) a segregated set of pools, but can alternatively share pools with other requesting systems. Each requesting system can be associated with one or more pools (example shown in FIG. 3). Each pool is preferably accessible by a single requesting system, but can alternatively be accessed by multiple requesting systems. In a first variant, an entity can access keys within a limited set of one or more pools (e.g., pools registered to the entity), either directly or through a client. In a second variant, a client can access keys across a plurality of pools (e.g., all pools). However, entities and clients can have other pool access permissions.

The pool data (e.g., pool configuration) can be stored in the pools datastore 160, in the registry datastore, and/or by any other suitable component.

Each pool can be associated with one or more keys (cryptographic keys, private keys, signing keys), example shown in FIG. 3. The keys can be used for: authentication (e.g., to authenticate that a message is sent by an owner), cryptographic signing (e.g., for a transaction, a message, a staking message, a validation message, etc.), decryption, and/or otherwise used. The keys are preferably not shared between pools, such that the pools (e.g., keysets) are segregated, mutually exclusive, and/or disjoint, but can alternatively be shared across pools (e.g., transferred between pools, concurrently part of multiple pools, etc.). In a specific example, each key is only associated with a single pool (e.g., single canonical pool).

A pool can include unrelated keys (e.g., generated from different cryptographic seeds, different keygen ceremonies, etc.) and/or only include related keys (e.g., only keys derived from a root key). A pool can include keys that are managed by different key management systems (e.g., "hot key" system, a "reusable/threshold signing" system, and a "cold key" system, etc.; example shown in FIG. 3); keys managed by different versions of similar key management systems; keys stored in different key stores using different storage schemes (e.g., cold storage, hot storage, distributed storage, etc.); keys applied using different signing schemes (e.g., TSS, MPC, single-signature, multisignature, etc.); keys applied using different signing algorithms (e.g., ECDSA, etc.); keys applied using different curves (e.g., ECDSA, ECDH, ECIES, EdDSA, ECMQV, ECQV, secp256k1); and/or keys with any other suitable differing key configuration parameter. Alternatively, all the keys within a pool can have the same key configuration.

The pool can be associated with a pool configuration (e.g., pool policy), which functions to specify and/or enforce administrative policies, key use policies, and/or other policies. This can also provide a centralized construct that allows requesting services (e.g., users) to dynamically change who, when, and how keys are used and managed. For example, a pool policy can specify that a first key is used for deposits (e.g., blockchain receives), while a second key is used for withdrawals (e.g., blockchain sends, blockchain payments, etc.). In this example, a user can easily change the second key to also receive deposits by authorizing deposits to the second key in the pool configuration, and can easily change the first key to also (or only) be used for withdrawals by enabling withdrawal functionality for the first key in the pool configuration (e.g., wherein the first key's addresses are provided for withdrawal requests). In a second example, a pool policy can specify that the first key is stored in cold storage; a user can easily move the key to hot storage by changing the key store configuration in the pool configuration (e.g., wherein the key is automatically reconstructed out of cold storage and transferred to a hot storage system responsive to the change).

A pool configuration is preferably specific to each pool, but can alternatively be shared across pools. Each pool preferably has a single pool configuration, but can alternatively have multiple pool configurations. All or a portion of the pool configuration for a pool can be: manually determined, automatically determined (e.g., from a template, implemented when an event occurs, determined based on the entity's anticipated risk and use case, etc.), and/or otherwise determined. The permissions specified in the pool configuration can be enforced by the platform, enforced by the registry, enforced by the key store, enforced by the signing system, enforced by the KMS, and/or otherwise enforced.

A pool configuration can include: the pool identifier, administrative policies, key use policies, the keys within the pool, the addresses within the pool, key configurations, address configurations, and/or other configuration parameters (example shown in FIG. 4A).

The pool identifier can include: a human-readable identifier, a globally unique identifier (e.g., within the system), a shared identifier, include or be derived from the identifier of the entity administering the pool, and/or any other suitable identifier.

Administrative policies (e.g., permissions) function to control pool: access, editing, addition, deletion, rotation, administrator changes (e.g., addition, removal, etc.), and/or other functionalities. Keys (and derivative or child data objects) can inherit the pool administrative policies, be more restrictive, and/or be more lenient. For example, the administrative policies can specify the requirements to access a pool, key, or key information (e.g., valid API key, whitelisted endpoint, whitelisted IP address geolocations, approval from multiple users, etc.). In another example, the administrative policies can specify which requesting services (e.g., clients) can access which keys (e.g., for use for a given functionality), based on the functionality associated with the requesting service and the functionality authorized for the key. In another example, the administrative policies can specify which requesting service can delete keys (e.g., burn keys), and the conditions under which the keys can be deleted (e.g., wherein the funds held by the addresses controlled by the keys must be less than a threshold amount before burning is permitted).

The key use policies function to specify how each key is used and/or which blockchain functionalities (e.g., blockchain interactions) a key can be used for. Examples of blockchain functionalities (blockchain actions, blockchain interactions) can include receiving, sending (e.g., withdrawals), staking/delegating, smart contract interactions (e.g., changing smart contract state, calling a smart contract function, depositing to a smart contract, withdrawing from a smart contract, etc.), and/or other blockchain functionalities. These functionalities can leverage the message signing functionality, use the address or key as an identity, or otherwise use the provided information. One or more of the aforementioned functionalities can be enabled simply by providing an address; others can be enabled by signing a blockchain message with a key (e.g., as discussed in S250) or otherwise enabled. In an illustrative example, a key use policy can specify that a key can sign delegation transactions, but cannot sign withdrawal transactions. In another illustrative example, a key use policy can specify that a key can receive deposits (e.g., wherein the associated address is provided to third parties for transaction construction), but cannot sign withdrawal transactions.

The key use policies can be specified at a pool level (e.g., and apply to all keys in the set), at a key level, at a key configuration parameter level (e.g., all cold stored keys can be used for a given functionality, all keys using a specific signing scheme are authorized for a given functionality, etc.), and/or at any other suitable level. The key use policy can include: a mapping between the authorized functionality and the key; a set of authorized functionalities stored within the key configuration; and/or be otherwise defined. The key use policies can be set by: the entity, the client, the blockchain protocol, and/or otherwise determined.

The key use policies can optionally include contextual limitations for key use, which can further limit when, where, and how the keys are used. Examples of contextual limitations include: time, geography (e.g., location of the requesting service), IP address (e.g., key use request must come from whitelisted IP address), transaction recipient limitations (e.g., the receiving address must not be blacklisted), enforced delays, authorized messages, and/or other contextual limitations.

The keys within the pool are preferably identified by their respective key identifiers (e.g., external key identifiers, KMS-specific key identifiers, etc.), but can additionally or alternatively be identified by their key configuration, be unidentified, be identified by the pool identifier that is stored in the respective key object (example shown in FIG. 4B), and/or otherwise identified.

Each key within each pool can be associated with a key configuration. Each key configuration can be specific to a key or be shared across keys (e.g., of the same or different pool). The key configuration can be used to: generate the key, retrieve key information associated with the key, retrieve the key, sign messages using the key, determine requesting system access to the key, and/or otherwise used.

All or portions of a key configuration can be: manually specified, determined from a template (e.g., allocation configuration), automatically determined (e.g., based on the client, based on the use case, based on the entity's risk, etc.), and/or otherwise determined. For example, the key configurations for a banking entity's pool can default to a cold storage key management system (e.g., due to the higher account balances and lower need for liquidity), while the key configurations for a merchant's pool can default to a hot wallet key management system (e.g., due to the need for liquidity). The key configuration can be stored as part of the pool configuration and/or be stored separately.

The key configuration can include: key permissions (e.g., who can add, edit, delete, the key or key configuration parameter values); a key identifier (e.g., human-readable identifier, locally unique identifier, public key, etc.); a pool identifier (e.g., that the key belongs to); a signing configuration; a key identifier for the key management system or key store; allocation configuration parameters; addresses controlled by the key; blockchain networks used with the key; key age; key history; and/or other parameter. The signing configuration can include (or include identifiers for) an identifier for the key store (e.g., system storing the key), the key management system (KMS) that manages the key; the signing scheme that the key is used in to generate a cryptographic signature; the curve that the key is used with to generate a cryptographic signature; the curve used to derive the key; and/or any other suitable parameter.

The addresses within the pool can be explicitly identified or implicitly identified within the pool configuration (e.g., by the associated key identifier). The addresses can be stored in cleartext or plaintext. The addresses within the pool are preferably the addresses associated with the keys within the pool (e.g., controlled by the keys, derived from the keys, etc.), but can include other addresses.

Each address can also be associated with an address configuration, which can be used to: generate (e.g., allocate, derive) the address (e.g., from the key); select the address for subsequent use (e.g., to return to the requesting service); and/or otherwise used. The address configuration can include: the blockchain network that the address was generated for; the address type (e.g., P2PKH, P2SH, which can be useful when a network supports different address types); the key identifier for the key controlling the address; the pool identifier that the controlling key belongs to; and/or other parameters. The address configuration can inherit configuration properties from the key's key configuration, or have other property values. For example, when a key is only authorized for a given functionality, the associated addresses can be only provided for use for said functionality.

3.6 Key Stores.

The system can be used with or include a set of key stores, which function to store the keys (examples shown in FIG. 1A and FIG. 3). Each key store can be a part of a KMS, or be separate from the KMSs. Each key store can be specific to or be shared by different KMSs. Each key store preferably has a different storage scheme, but can alternatively have the same storage schemes. Examples of storage schemes that can be used include: cold storage (e.g., as described in U.S. patent application Ser. No. 16/386,786, filed 17 Apr. 2019 and/or U.S. patent application Ser. No. 16/952,539 filed 19 Nov. 2020, the contents of which are hereby incorporated by reference, or otherwise determined); hot storage (e.g., in a system that is connected to the internet or another network); distributed storage (e.g., wherein the keys are stored in different physical systems and/or managed by different entities), and/or other storage schemes. Different key stores can be physically collocated, distributed, or otherwise arranged. The system can include a single instance of each key store (e.g., shared between pools), multiple instances of each key store (e.g., for different geographies, for redundancy, etc.), an instance of each key store for each requesting entity or pool, and/or any number of instances of each key store.

The key store can optionally generate keys. In a first variation, the key can be generated by generating a seed and deriving a set of keys (e.g., an asymmetric keypair) from the seed. In a second variation, the key can be generated using a key generation ceremony (e.g., online ceremony, offline ceremony, sandboxed ceremony, etc.). However, the key can be otherwise generated.

3.7 Signing Systems.

The system can be used with or include a set of signing systems, which function to sign messages using the keys. Each signing system can be a part of a KMS, or be separate from the KMSs. Each signing system can be specific to or be shared by different KMSs.

Each signing system preferably has a different signing scheme, but can alternatively have the same signing schemes. Examples of signing schemes that can be used include: a single-signature signing scheme, a Shamir Secret Sharing scheme, a multisignature scheme, an aggregated signature scheme, a multi-party computation scheme, a threshold signing scheme, and/or any other suitable signing scheme. In a specific example, the signing system can leverage the signing scheme described in U.S. patent application Ser. No. 16/983,216 ("Systems and Methods for Generating Signatures"), filed 3 Aug. 2020, the contents of which are hereby incorporated by reference. In a second specific example, the signing system can leverage the signing scheme described in U.S. patent application Ser. No. 17/072,395 ("Systems and Methods for Re-Using Cold Storage Keys"), filed 16 Oct. 2020, the contents of which are hereby incorporated by reference. However, any other suitable signing scheme can be used.

Different signing systems can be physically collocated, distributed, or otherwise arranged. The system can include a single instance of each signing system (e.g., shared between pools), multiple instances of each signing system (e.g., for different geographies, for redundancy, etc.), an instance of each key store for each requesting entity or pool, and/or any number of instances of each key store. A signing system can sign messages using: a key (e.g., retrieved from the respective key store), the signing scheme (e.g., of the signing system), a curve (e.g., specified in a signing request, specified by the signing system, etc.), a signing algorithm (e.g., specified in a signing request, specified by the signing system, etc.), hash functions (e.g., specified in a signing request or by the signing system), and/or other signing parameters. The signing parameters can be specified by the key configuration, specified by the requesting system, and/or otherwise determined. Examples of curves that can be used include: ECDSA, ECDH, ECIES, EdDSA, ECMQV, ECQV, secp256k1, and/or other curves. Examples of signing algorithms that can be used include: RSA (RSASSA-PKCS-v1_5, RSASSA-PSS, RSAES-OAEP), Elliptic Curve (ECDSA), Schnorr, BLS, and/or other algorithm classes. Examples of hash functions that can be used include: SHA256, SHA384, SHA5128, and/or other hash functions.

3.8 Key Management Systems.

The system can be used with or include a set of key management systems (KMS) (e.g., signing backend, signing service), which can function to generate keys, generate addresses, store keys, sign messages, and/or perform other functionalities (examples shown in FIG. 1A, FIG. 1B, FIG. 3, FIG. 9, FIG. 13, FIG. 14, and FIG. 16). The key management systems can be part of the system, be an external key management system (e.g., specified for use by the requesting system), and/or otherwise related to the system. Each key management system can include a key store from the set of key stores, a signing system from the set of signing systems, and/or other components. Each KMS can have the same or different key store-signing system combination. Each key management system can be shared across multiple pools (e.g., each KMS can store and sign using keys from multiple pools), can be specific to a pool, and/or be otherwise shared across pools. The key management system can be a custodial key management system, or a non-custodial key management system. In a first example, the key management system is a key management system that performs a synchronous signing process. In a second example, the key management system performs an asynchronous key management system. In a third example, the key management system is a threshold key management system. In a fourth example, the key management system is a hot key key management system. In a fifth example, the key management system is a key management system that performs signing using reusable cold keys. In a sixth example, the key management system is a cold key key management system. In a seventh example, the key management system is a non-custodial key management system that performs signing at a secure signing enclave running on a requesting system 140.

3.9 Blockchain Network Modules.

The system can be used with one or more blockchain network modules 120 (e.g., transaction generators, "coin ops"). The blockchain network module 120 can manage all blockchain protocol-specific functions (e.g., address derivation, address-public key verification, transaction generation, transaction parsing, transaction combining, etc.), a subset of blockchain protocol-specific functions (e.g., wherein another component performs some functions and the blockchain network module performs other functions), interact with the respective blockchain network (e.g., via the respective blockchain node), and/or be configured to perform any other suitable set of functions. Each blockchain network module is preferably shared across the pools, but can alternatively be specific to a pool. In a first variant, each blockchain network module functions to generate unsigned transactions for a specific blockchain protocol. In a second variant, a single blockchain network module functions to generate unsigned transactions for a plurality of specific blockchain protocols. In some implementations, the blockchain network module is constructed to generate blockchain transactions for a plurality of blockchain protocols (e.g., wherein the client request can identify the blockchain protocol for message construction). The blockchain network module is preferably a separate component from the system (e.g., an external service to the system), but can alternatively be part of the system.

3.10 Platform.

The platform 110 (e.g., central system) functions to perform all or part of the method discussed below, and can initialize one or more pools, process requests received from one or more requesting systems 140 for one or more pools, and/or perform other functionalities. For example, the platform can: allocate keys to pools, allocate addresses to pools, manage pool updates or changes, return key information or pool information, coordinate message signing, coordinate blockchain functionality execution, and/or perform other functions. The platform can interact with the requesting systems via an API or another interface.

Figure 1B:
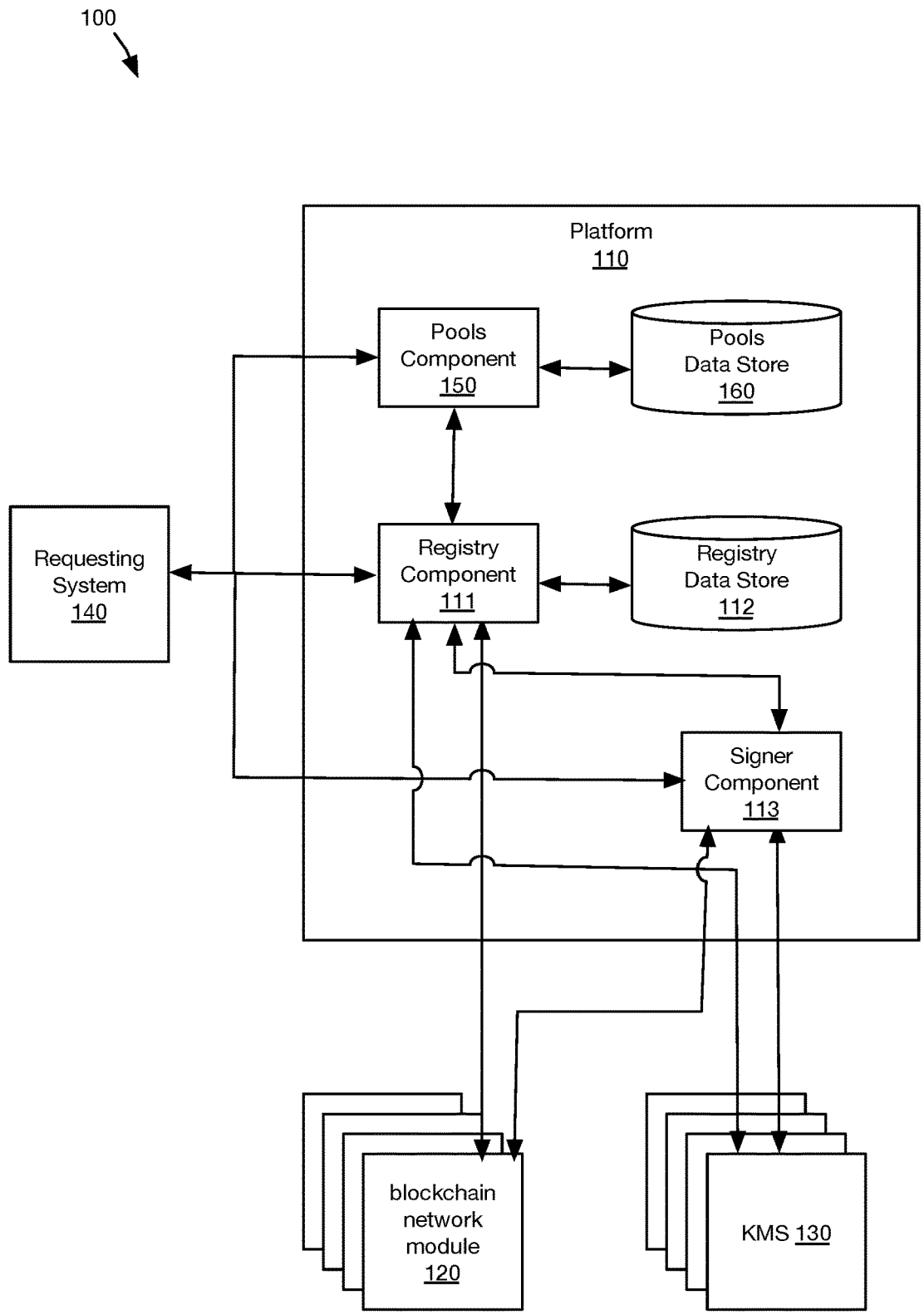
FIG. 1B is a schematic representation of a variant of the platform.

The platform no can include a pools component 150, which is preferably coupled to (or includes) a pools data store 160 that stores information for each pool created by the key management system 110 (example shown in FIG. 1B). The pools component 150 preferably functions to register a pool (e.g., create the pool), and optionally provide access to a pools data store 160 that functions as a global source of truth for pool entities, and allows for requesting systems 140 to create or fetch pool information.

The platform no can also include one or more of a registry component 111, a signer component 113, a balance component, and/or other components (example shown in FIG. 1B). In some implementations, the functionality of one or more of the components, such as the registry component 111 and the signer component 113, can be performed by a single component. The registry component in is preferably coupled to (or includes) a registry data store 112.

The registry component nil functions to enable clients to configure key management systems 130 for a particular pool, and orchestrate new key/address allocation for a pool. The registry component can optionally retrieve pool information and/or key information for requesting systems. The registry component nil preferably provides an API for various lookup operations.

The signer component 113 preferably functions to orchestrate message or transaction generation and signing between the key management systems and other system components.

The balance component functions to determine cryptocurrency balances across a pool (e.g., an aggregate cryptocurrency balance across all addresses controlled by keys in the pool), for a key, for an address, and/or any other suitable balance.

In variants, the platform 110 (or one or more components of the platform 110) is implemented as a distributed system. In an example, the platform 110 can include components for specific jurisdictions, such that pools for specific jurisdictions (e.g., countries, states, etc.) are managed by components residing in those specific jurisdictions (or configured in accordance with regulatory requirements of those specific jurisdictions). For example, platform components for a Japanese jurisdiction can be restricted to using key management systems located in Japan, or specific key management systems that have been certified for compliance with Japanese laws and/or regulations.

In some variations, one or more of the components of the system are implemented as a hardware device that includes one or more of a processor, a display device, a memory, a storage device, an audible output device, an input device, an output device, and a communication interface. In some variations, one or more components included in the hardware device are communicatively coupled via a bus. In some variations, one or more components included in the hardware device are communicatively coupled to a requesting system via the communication interface.

Processors can include one or more of a CPU (central processing unit), GPU (graphics processing unit), NPU (neural processing unit), and any other suitable processing system that functions to execute machine-readable instructions.

The communication interface functions to communicate data between the hardware device and another device via a network (e.g., a private network, a public network, the Internet, and the like).

In some variations, the storage device includes the machine-executable instructions for performing at least a portion of the method 200 described herein.

In some variations, at least one component of the system performs at least a portion of the method 200 described herein.

4. Method.

Figure 2:
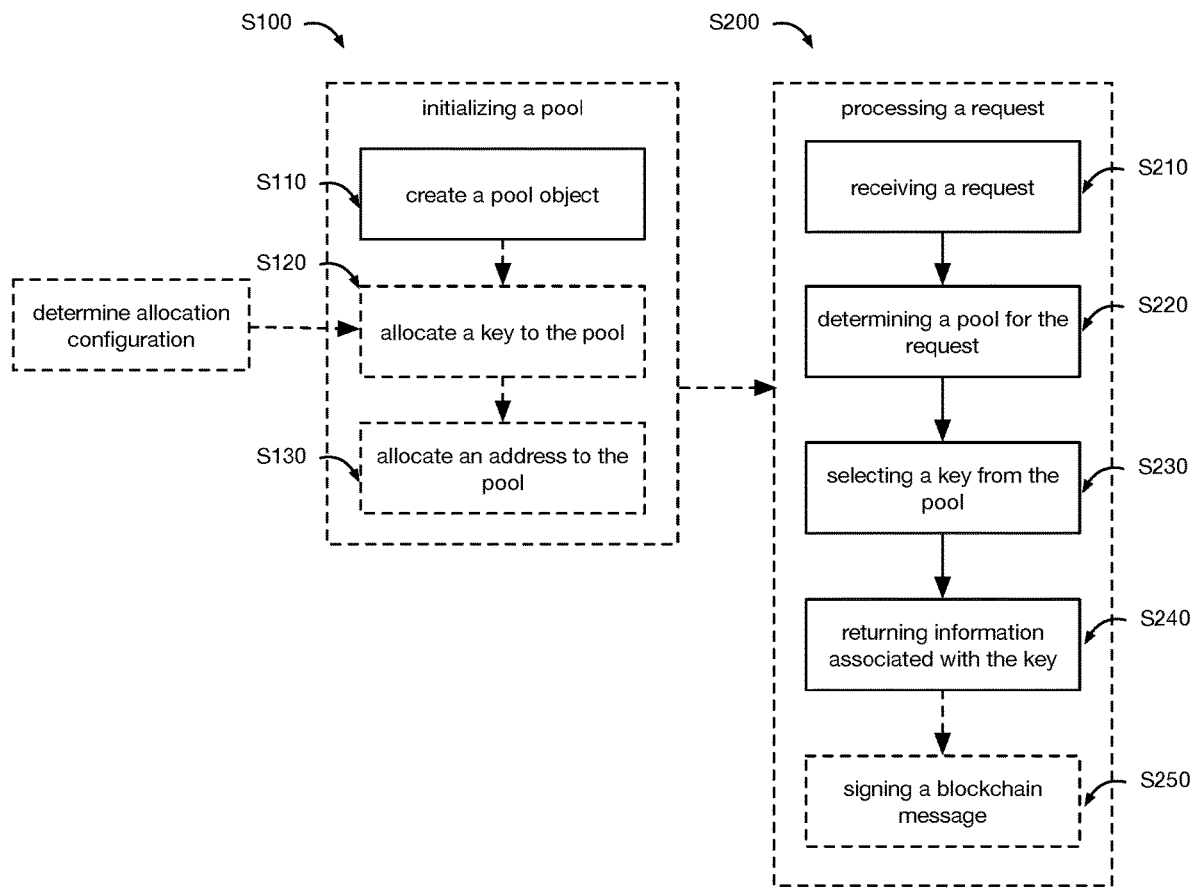
FIG. 2 is a representation of a variant of the method.

The method can include initializing a pool S100 (example shown in FIG. 2). This can function to create a segregated keyset that can be controlled and used as a unitary set (e.g., pool). The method can optionally include processing a request S200 (example shown in FIG. 2), which can function to enforce key segregation and key usage policies.

All or portions of the method are preferably performed by the platform 110; alternatively, all or portions of the method can be can be performed by the requesting system, the key management system(s), at least one component of the system 100, and/or by any other suitable component.

All or portions of the method can be performed in response to receipt of a request from a requesting system 140, a request received from a non-requesting system, detection of a predetermined event, and/or any suitable trigger. All or portions of the method can be repeated for different pools and/or requesting systems.

In variants, the platform 110 authenticates requests received from requesting systems (e.g., before performance of each method instance, before responding to a request, etc.), and optionally authorizes at least one request based on access permissions (which can be set for a pool, a user, a requesting system, a request, etc.). For example, the system can verify that a requesting entity or client is authorized to access a pool or key, or verify that a requesting client is authorized to use a specific key for a requested functionality. The system can authenticate requests based on: the requesting system's identifier (e.g., username, IP address); an API token issued to the requesting system and associated with access permissions; and/or otherwise authenticate the requests. The system can verify requesting system authorization based on: the pool configurations, key configurations, address configurations, and/or any other suitable set of policies. However, all or portions of the method can be otherwise performed.

4.1 Initialization.

Initializing a pool S100 functions to create a set of segregated keys that one or more requesting systems are authorized to access (e.g., use or retrieve information for). Initializing a pool can include: creating a pool object S110, optionally allocating a key to the pool S120, optionally allocating an address to the pool S130, and/or optionally creating a pool configuration S140, (example shown in FIG. 2) but can additionally or alternatively include any other suitable processes.

4.1.1 Creating a Pool Object.

Figure 6:
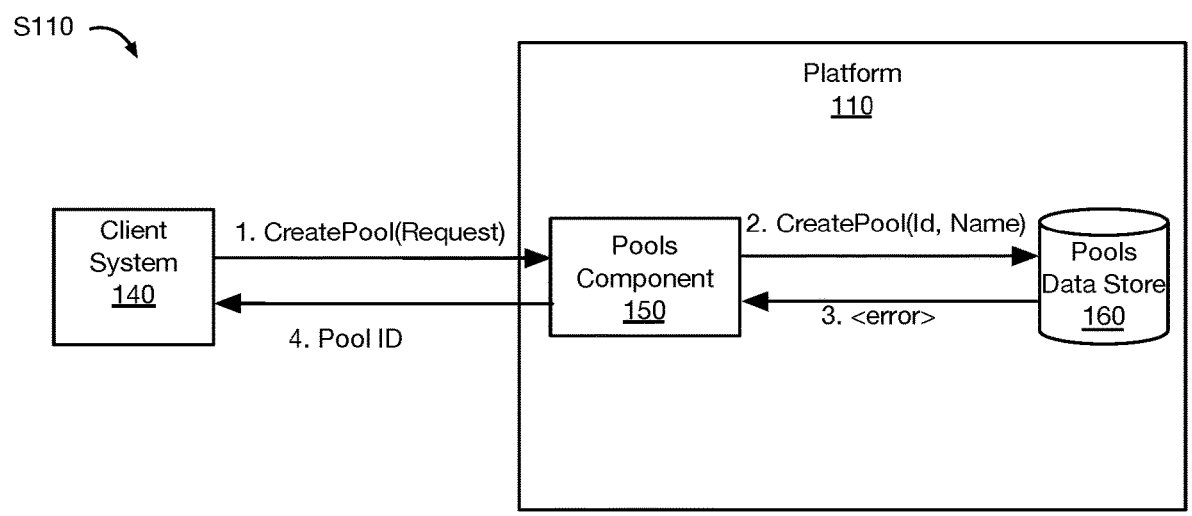
FIG. 6 is a schematic representation of an example of configuring a pool.

Creating a pool object S120 functions to create a new pool entity that requesting systems can interact with as a unit, instead of individually interacting with the underlying keys. A pool object can be created by requesting systems 140 (example shown in FIG. 6), system administrators, jurisdictional administrators, users (e.g., directly or using client intermediaries), the platform, the pools component, the system, and/or any other suitable system. pools are preferably created in response to receipt of an authorized Create pool request received from a requesting system (e.g., 140) (e.g., via an API, user interface, network interface, storage device, etc.), but can be automatically created (e.g., for each new requesting system registered with the system, for each new jurisdiction authorized for the system, etc.), and/or otherwise created. The create pool request can include: a pool identifier, a human-readable identifier, and/or any other suitable information.

Creating a pool object can include: specifying a unique pool identifier, specifying a human-readable identifier, and/or otherwise defining the pool.

The pool identifier functions to identify the pool within the system, but can be otherwise used. The pool identifier is preferably globally unique within the system, but can alternatively be shared. The pool identifier can be: an alphanumeric ID, an API token, the requesting system's identifier (e.g., username, etc.), and/or any other suitable identifier. The pool identifier is preferably automatically assigned by the system (e.g., by the registry, by the platform, the pool component 150, etc.), but can be specified by the requesting system or be otherwise determined. The pool identifier is preferably stored in the pools database, but can be otherwise stored.

The human-readable identifier functions to enable a human to easily identify the pool identifier. The human-readable identifier can be an alphanumeric identifier (e.g., including descriptive names, such as the name of the entity and/or relevant jurisdiction), be an icon, and/or be any other suitable identifier. The human-readable identifier can be specified by the requesting system (e.g., in the create pools request), or be otherwise specified. The human-readable identifier is preferably stored in the pools database in association with the pool identifier, but can be otherwise stored.

In a first example, one or more of a pool identifier (e.g., a UUID) and an optional human readable name are included in the Create pool request. Alternatively, the pool component 150 creates one or more of the new pool identifier and the name. The pool component 150 stores the pool identifier (and optional name) in the pool data store 160. The pool component 150 then provides the pool identifier (and optionally the name) to the requesting system. However, a pool object can be otherwise created.

4.1.2 Key Allocation.

Allocating a key to a pool S120 functions to populate the pool object with one or more keys. The key (and/or other resources associated with the pool) is preferably associated with an identifier for the pool (e.g., the key object stores a pool identifier or pool reference), but can be otherwise associated with the key. The pool object can optionally be associated with an identifier for the key (e.g., the pool object is stored in association with the key identifier, example shown in FIG. 3), be associated with the key itself (e.g., the cleartext or encrypted key is stored in association with the pool object), not store the key identifier, or be otherwise associated with the key. The keys are preferably specific to the pool (e.g., segregated; not shared across pools), but can alternatively be shared across pools. The key can be allocated to the pool by: the requesting system (e.g., wherein the requesting system initiates key allocation or adds a pre-existing key to the pool); the system (e.g., wherein the system coordinates key generation and association with the pool); one or more key management systems; one or more key stores; one or more signing systems; and/or by another system.

One or more key allocation instances can be performed for each pool, which can allocate multiple keys to a given pool. Key allocation can be performed: in response to receipt of a key allocation request from a requesting system, automatically (e.g., upon pool creation), upon satisfaction of a predetermined condition (e.g., the balance of another key in the pool exceeding a threshold value, etc.), and/or at any other suitable time.

In a first variant, allocating a key to the pool includes adding a predetermined key. This variant can include: receiving a request including a key and a pool identifier, and storing the key in association with the pool identified by the pool identifier. In a first embodiment, storing the key in association with the pool identifier can include storing the key as part of the pool object. In a second embodiment, storing the key in association with the pool includes generating a key object or representation for the key, storing the pool identifier with the key object, and storing the key in a key store, wherein the key store can be determined: automatically (e.g., based on which requesting system is adding the key), based on the request (e.g., wherein the request specifies a key store or KMS), and/or otherwise determined. In a third embodiment, allocating a key to the pool includes storing a key identifier with the pool object.

Figure 9:
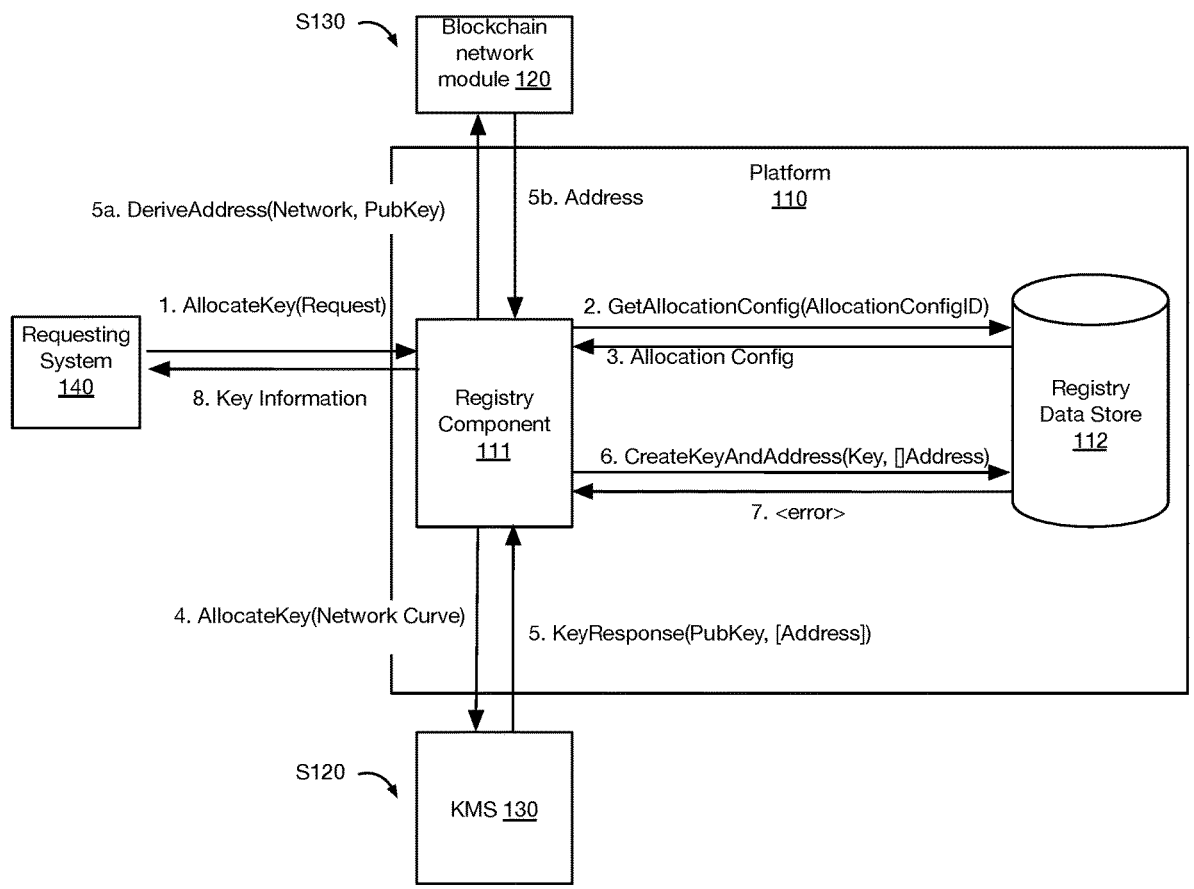
FIG. 9 is a schematic representation of an example of key allocation.

In a second variant, allocating a key to the pool includes receiving an instruction to generate the key (example shown in FIG. 9). This variant can include: receiving a request including a key template identifier (e.g., allocation configuration identifier) and a pool identifier; generating a key based on the key template identified by the key template identifier; and storing the key in association with the pool identified by the pool identifier.

Figure 8:
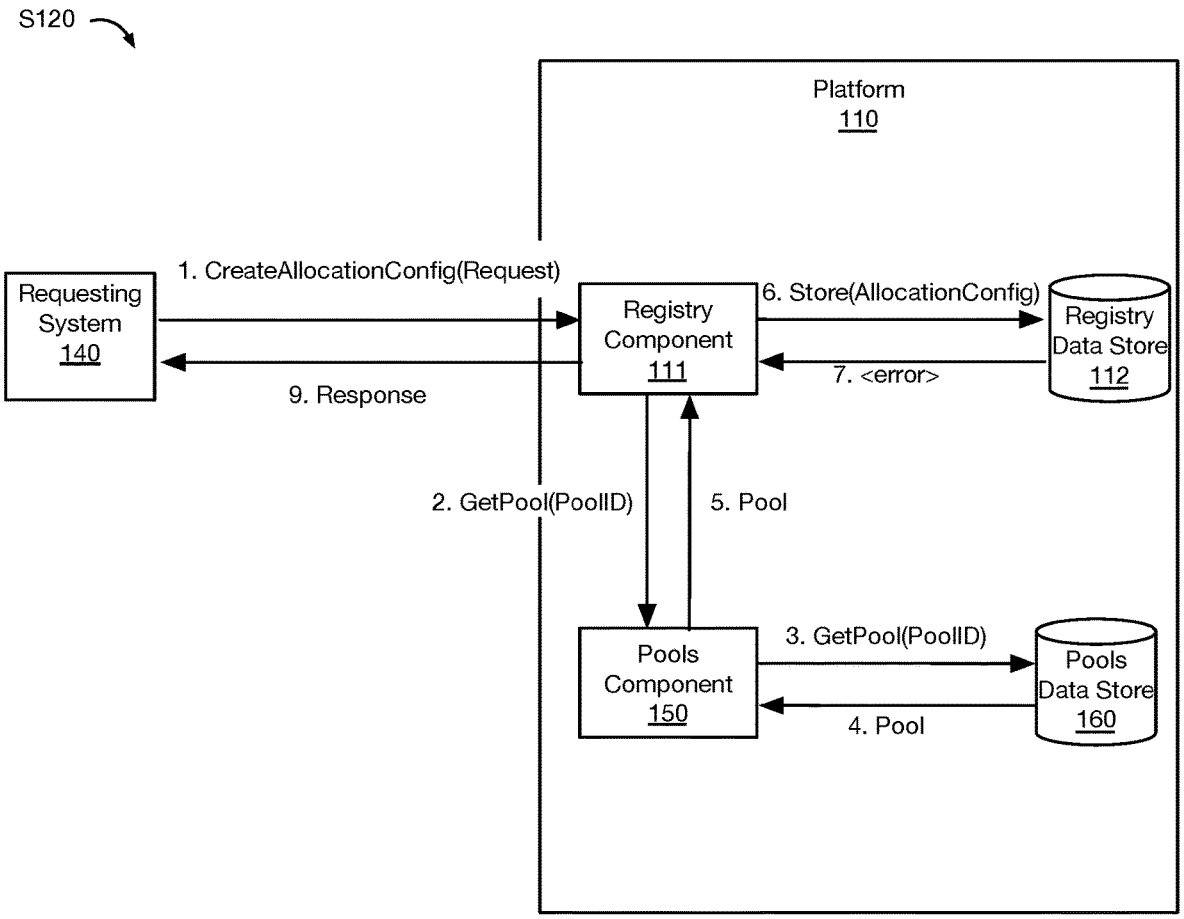
FIG. 8 is a schematic representation of an example of creating an allocation configuration.

The allocation configuration is preferably a template for key allocation to the pool, but can alternatively be a set of predetermined key allocation requests or be any other suitable configuration. Each pool can be associated with one or more allocation configurations. The allocation configuration can be specific to a key management system, specify multiple key management systems, or be generic. When the allocation configuration specifies multiple key management systems, the allocation configuration can optionally specify: a ratio of key allocations between the specified set of KMSs (e.g., 20% from a first KMS and 80% from a second KMS), a number of keys to allocate from each KMS, a minimum or maximum number of keys to allocate from each KMS, a priority ranking between the specified KMSs (e.g., allocate from a first KMS until a condition is met, then allocate from a second KMS, etc.), and/or other key allocation rules or conditions. The allocation configuration can be specific to a pool or be generic (e.g., shared across pools). The allocation configuration can include: the key management system identifier (e.g., used to allocate keys and generate signatures for keys allocated using the allocation configuration), the curve for the key, the pool identifier, a blockchain network identifier, a blockchain protocol identifier, a human-readable name, an allocation configuration identifier, a KMS identifier, a key store identifier, a signing scheme identifier, key allocation parameters for key allocation (e.g., specific to the key type, the curve, the key management system, etc.; e.g., nonces), signing parameters for the signing system, and/or any other suitable information. For example, allocation configurations function as templates for allocating a new key: they specify a key management system and (optionally) additional parameters to provide to the key management system to allocate a key. The allocation configuration can be determined (e.g., specified) by the requestor, the pool, an indexing system, a library, a user, an administrator, and/or any other suitable component or entity. In a specific example, the generated allocation configuration is preferably generated by the registry component 111 and stored at the registry data store 112 (example shown in FIG. 8). Alternatively, another system (e.g., the requesting system 140) can generate the allocation configuration, and provide the allocation configuration in the allocation configuration request that is sent to the registry component 111. However, allocation configuration can otherwise be generated.

An allocation configuration for a pool can be generated (e.g., by the registry component 111, by a requesting system 1409, etc.) in response to any suitable trigger, and at any suitable time. For example, allocation configuration can be generated for a pool when the pool is created. Additionally, or alternatively, allocation configuration can be generated after a pool has been created, for example, to add an additional allocation configuration for a pool. In variants, allocation configurations for a pool can be removed. For example, a key management system for a pool can be replaced with a new key management system (e.g., a new version, a new type of key management system etc.) by removing the allocation configuration for the old key management system, and adding an allocation configuration for the new key management system. Restrictions can be placed on adding and removing allocation configuration for a pool by authenticating requests to add or remove allocation configuration, and processing such requests in response to confirming that the authenticated requestor has valid permissions to perform the requested operation.

In variants, after storing the allocation configuration, the registry component 111 provides the requesting system (e.g., 140) with an allocation configuration identifier. This allocation configuration identifier (key template identifier) can be used to allocate a key.

Generating a key based on the key template functions to create the actual key or keypair (e.g., asymmetric keypair). The public key and/or identifier for the private key can be returned. The key is preferably generated according to the allocation configuration information, but can be otherwise generated. The key is preferably generated by the key store (e.g., a KMS), but can alternatively be generated by a blockchain module (e.g., specific to the blockchain network or protocol identified in the request), a separate system (e.g., a key generation system). The key store generating the key is preferably identified in the request (e.g., by a key store identifier or KMS identifier), but can alternatively be automatically determined (e.g., based on the requesting system, based on the function associated with the key, etc.), randomly determined, or otherwise determined. The key store is preferably a preexisting key store (e.g., wherein the key store is shared with other pools), but can alternatively be specific to the pool, specific to the key, specific to the allocation configuration, and/or otherwise defined. In a first embodiment, the key is generated by generating a seed (e.g., randomly, deterministically, etc.), deriving a private key from the seed, and deriving a public key from the seed. In a second embodiment, the key is generated using a key generation ceremony (e.g., online, offline, etc.). In a third embodiment, the key is generated by a blockchain network. In a fourth embodiment, the key is cooperatively generated by multiple users (e.g., using an MPC or threshold method). However, the key can be otherwise generated.

Storing the key in association with the pool identified by the pool identifier can include storing the key (e.g., in cleartext or encrypted format) with the pool object, storing a pool identifier with the key object (e.g., a representation of the key, wherein the key itself is stored in the key store), and/or otherwise stored.

Several allocation configuration requests can be processed for a same pool, so as to configure several key management systems for a same pool. For example, a pool can be configured such that it can be allocated both hot and cold keys. Additionally, or alternatively, this can include processing several allocation configuration requests for different pools.

FIG. 9 depicts an example process for allocation of a key to a pool. In variants, this includes receiving a generic key allocation request from a requesting system (e.g., 140). However, keys can be allocated in response to any suitable trigger. The generic key allocation request preferably identifies an allocation configuration identifier. The generic key allocation request can optionally identify one or more of a blockchain network (e.g., "bitcoin-mainnet", "tezos-testnet", etc.) and a specific signing scheme. In an example, the signing scheme information included in the generic key allocation request identifies a curve of a digital signature algorithm (e.g., ECDSA, etc.). The platform no processes generic key allocation requests by accessing the allocation configuration (from the registry data store 112) using the allocation configuration identifier. The platform no uses the allocation configuration to select the appropriate signing system 130, and send the signing system a system-specific key allocation request. The system-specific key allocation request optionally identifies a blockchain network (e.g., "bitcoin-mainnet", "tezos-testnet", etc.) and a specific signing scheme (e.g., as indicated by the received generic key signing request. The signing system 130 generates a public key, based on the system-specific key allocation request, and provides the public key to the platform no.

The platform no then stores the public key in the registry data store 112, along with at least one of: an identifier for the key; an identifier for the allocation configuration used to allocate the key; an identifier for the signing system 130 associated with the key; an identifier for the pool associated with the allocation configuration; a blockchain network (e.g., specified by the generic or system-specific allocation request); key allocation parameters for the signing system used to allocate the key; and key signing parameters (e.g., a curve) used for generating signatures for the key by using the signing system that allocated the key. However, the public key can be stored in association with any suitable information.

The platform 110 then provides the requesting system with one or more of the allocated keys, and an identifier for the allocated key. The identifier can be used by the requesting system 140 to request the allocated key information from the platform 110.

4.1.3 Address Allocation.

Figure 10:
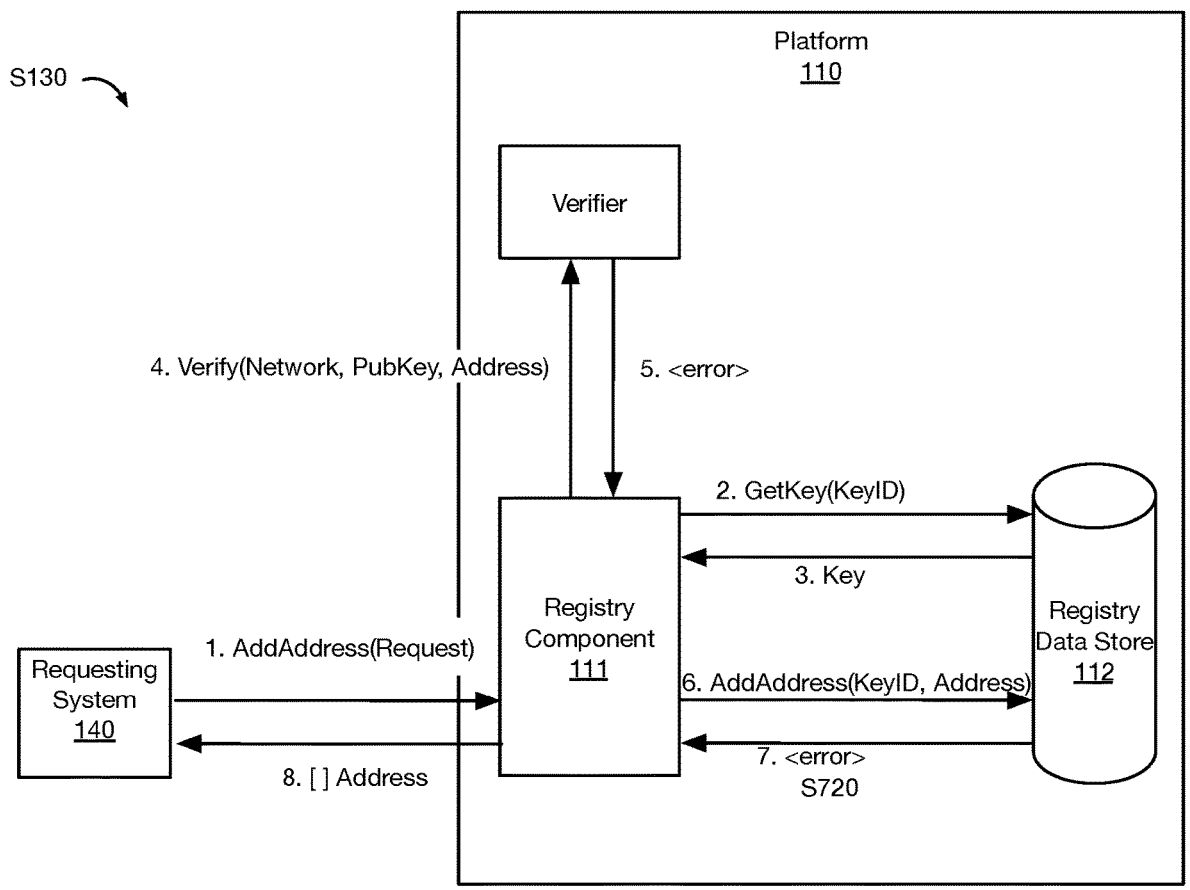
FIG. 10 is a schematic representation of an example of adding an address for a key.

Allocating an address to the pool S130 functions to create an on-chain identity to support blockchain interactions, such as sends, receives, smart contract interactions, and other functionalities. The addresses are preferably generated (e.g., derived) based on the public key of a private key within the pool, but can alternatively be generated from the private key within the pool, keys outside of the pool, and/or other keys. The private key paired with the public key that is used to derive the address preferably controls the address (e.g., signs blockchain messages, transactions, actions, etc. from the address), but can be otherwise related to the address. The addresses are preferably generated based on address allocation parameters, but can alternatively be generated based on a template or otherwise determined. Address allocation parameters can include: a key identifier for the key from which the address is to be derived, an address identifier (e.g., human-readable, system identifier, etc.), the blockchain network that the address is for, the address type (e.g., P2PKH, P2SH), and/or any other suitable information. All or portions of the address allocation parameters can be: received as part of the address allocation (and/or key allocation) request, automatically determined (e.g., from user preferences, based on the requesting system, etc.), and/or otherwise determined. The address is preferably generated by a blockchain network module for the blockchain network that the address is intended for (example shown in FIG. 9), but can additionally or alternatively be generated by the KMS, the key store, or other system (e.g., based on the blockchain protocol for the blockchain network). Alternatively, the address can be extracted from an address addition request, optionally verified by the respective blockchain module, and stored in association with the pool object (example shown in FIG. 10). The address, an address identifier, a key identifier, and/or other information can be returned and/or stored in association with the key identifier, pool object, and/or other object.

In an example, addresses can be generated for the public key, and generated addresses can be stored at the registry data store 112 in association with the corresponding public key. Addresses generated in response to a key allocation request can be provided to the requesting system. Each address can be stored at the registry data store 112 in association with at least one of: a pool identifier, a blockchain network identifier; and an address type. The addresses can be generated by the key management system 130, by the platform 110, by the requesting system 140, and/or by any other suitable system.

The platform can add an address to an existing key (e.g., a key, example shown in FIG. 9). An address can be added in response to any suitable trigger, and at any suitable time.

In an illustrative example, the platform 110 receives an Add Address request from a requesting system 140 (e.g., shown in FIG. 10), and adds a new address to an existing key during processing of the Add Address request. In variants, the Add Address request is provided for servicing origination-based blockchains (e.g., EOS) where the address is created via an on-chain transaction. In some implementations, the add Address request can be used to add an address in the case of a forked network where a backfill of the new network addresses is required. In some implementations, the Add Address request identifies at least one of: a public key; a blockchain network; an address; and an address type. The address type parameter can identify a specific address type, in a case where the network supports multiple address types. For example, the Bitcoin network supports several address types, including P2PKH, P2SH, etc. However, the Add Address request can include any suitable information. The platform 110 stores information in the data store 112 that associates the address identified in the Add Address request with the public key identified in the Add Address request. A verification step can be performed to verify that the address specified in the Add Address request is controlled by the platform no (such that blockchain transactions requiring a signature for the address must be signed by using the platform no, and not some other, external, and possibly malicious system).

Figure 11:
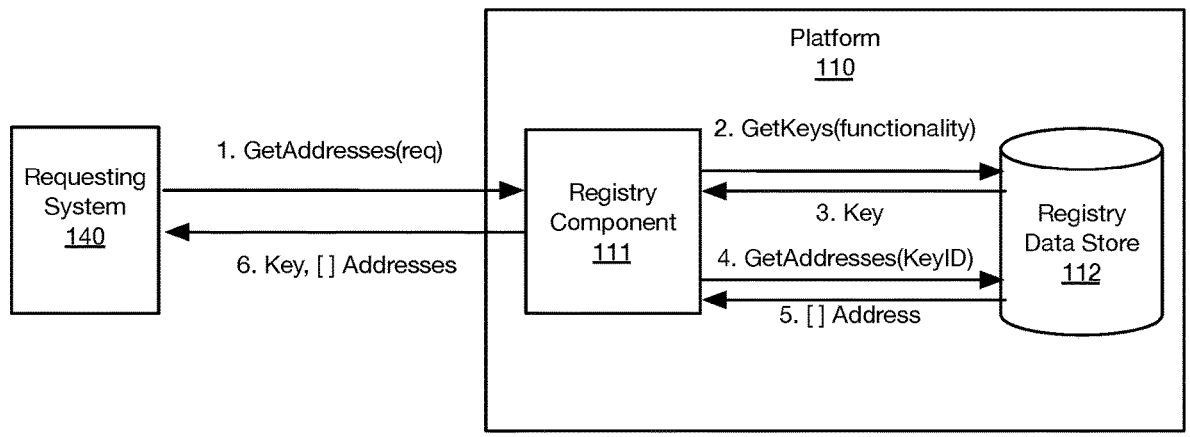
FIG. 11 is a schematic representation of an example of retrieving addresses for given blockchain functionality.
Figure 12:
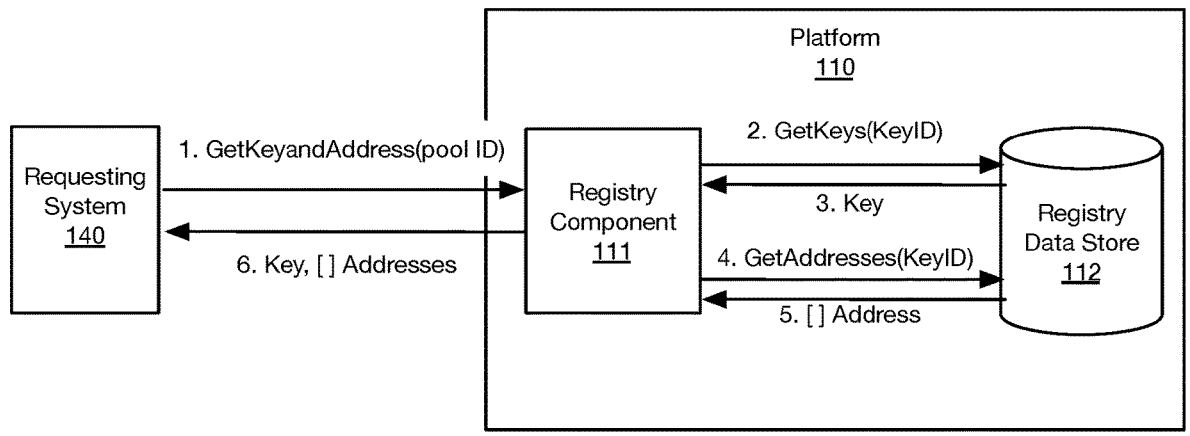
FIG. 12 is a schematic representation of an example of retrieving addresses associated with a key.

Once a key has been allocated, information related to the key (e.g., the public key, addresses associated with the public key, metadata for the key, etc.) can be accessed by using one or more of a pool identifier, an allocation configuration identifier, a key identifier, an address or identifier thereof, an entity identifier, and/or other identifying information. In a first example, a requesting system can request (from the platform 110), a public key for a given key identifier (example shown in FIG. 12). In a second example, a requesting system can request all addresses for a given public key identifier (example shown in FIG. 12). In a third example, a requesting system can request all public keys for a pool. In a fourth example, a requesting system can request all addresses for a pool. In a fifth example, a requesting system can request all public keys for a given allocation configuration. In a sixth example, a requesting system can request all addresses for a given allocation configuration. In a seventh example, a requesting system can request all public keys for a list of one or more addresses. In an eighth example, a requesting system can request all keys and/or addresses authorized for a given blockchain functionality (example shown in FIG. 11).

4.1.4 Pool Configuration.

The method can optionally include creating a pool configuration that functions to set policies for the pool. The pool configuration can be determined responsive to a pool configuration request, determined when the pool is created, and/or determined at any other suitable time. The pool configuration can be: determined from a pool configuration request, automatically determined based on the requesting system (e.g., from a predetermined set of policies for the entity or client), and/or otherwise determined.

4.2 Processing a Request.

The method can additionally or alternatively include processing a request S200, which can include: receiving a request S210; determining a pool for the request S220; selecting a key from the pool S230; returning information associated with the pool S240; and/or other processes (example shown in FIG. 2). This can function to isolate request response processing to keys that the requesting system is authorized to use, and can function to enforce pool policies (e.g., key use policies) on the requests. The request is preferably processed after the pool has been initialized, but can alternatively be processed before or during pool initialization. The request is preferably processed by the system, more preferably the platform but alternatively another component, but can alternatively be performed by any other suitable computing system. S200 can be repeated for each request, be periodically repeated, and/or be performed at any other suitable time or frequency. S200 can be repeated for different requesting systems, wherein different pools, keys, addresses, key stores, signing systems, KMS systems, data structures and/or components can be used.

4.2.1 Request Receipt.

Receiving a request S210 functions to receive information indicative of pool interaction intent. The request is preferably received from a requesting system, but can alternatively be received from a system component and/or from any other suitable endpoint. For example, the request can be received from an entity, from an entity via a client, from the client, and/or from any other suitable endpoint. The request can include: a requesting system identifier, a pool identifier, a key identifier, an address identifier, a pool interaction identifier, auxiliary interaction information (e.g., message to be signed, transaction to be signed, amount to stake, smart contract interaction parameters, new policy values, etc.), and/or other information. Examples of requests that can be received include: blockchain functionality requests (e.g., send, receive, delegate, smart contract interactions, etc.); pool information requests (e.g., pool keys, pool addresses, pool balances, pool configurations, etc.); pool interaction requests (e.g., add authorized party, remove authorized party, change permissions, change key configuration parameters, etc.); and/or other pool interactions.

Receiving a request can optionally include verifying access to the requested data. In a first variation, when the request is a blockchain functionality address request, verifying access can include: verifying that the requesting system (e.g., entity, client) has access to the pool (e.g., using pool access permissions) and verifying that the pool has an address associated with the functionality for the requested blockchain network (e.g., based on the constituent keys' usage policies). In a second variation, when the request is a blockchain functionality execution request, verifying access can include: verifying that the requesting system has access to the key associated with the address identified in the blockchain message (e.g., based on the pool access permissions and/or the pool configuration), and verifying that the key can be used for the functionality associated with the blockchain message (e.g., based on the key usage policies). In a third variation, when the request is a pool information request, verifying access can include verifying that the requesting system has access to the pool and/or specific pool information variables (e.g., based on the pool access permissions). In a fourth variation, when the request is a pool interaction request, verifying access can include verifying that the requesting system has access to the pool (e.g., based on the pool access permissions), and verifying that the requesting system has permission to interact with the pool in the requested manner (e.g., based on the pools administrative policies). However, requesting system access to the requested information can be otherwise verified.

4.2.2 Pool Determination.

Determining a pool for the request S220 functions to determine which pool to use to respond to the request. The pool can be: the pool that the requesting system (e.g., the requesting entity, the client, etc.) is authorized to access, the identified pool, the pool associated with a credential provided with the request (e.g., pool corresponding to a valid API token provided as part of the request), and/or any other suitable pool.

In a first variant, determining the pool includes extracting the pool identifier from the request, selecting the pool associated with the pool identifier, and optionally determining whether the requesting system is authorized to access the pool (e.g., based on the pool configuration).

Figure 15:
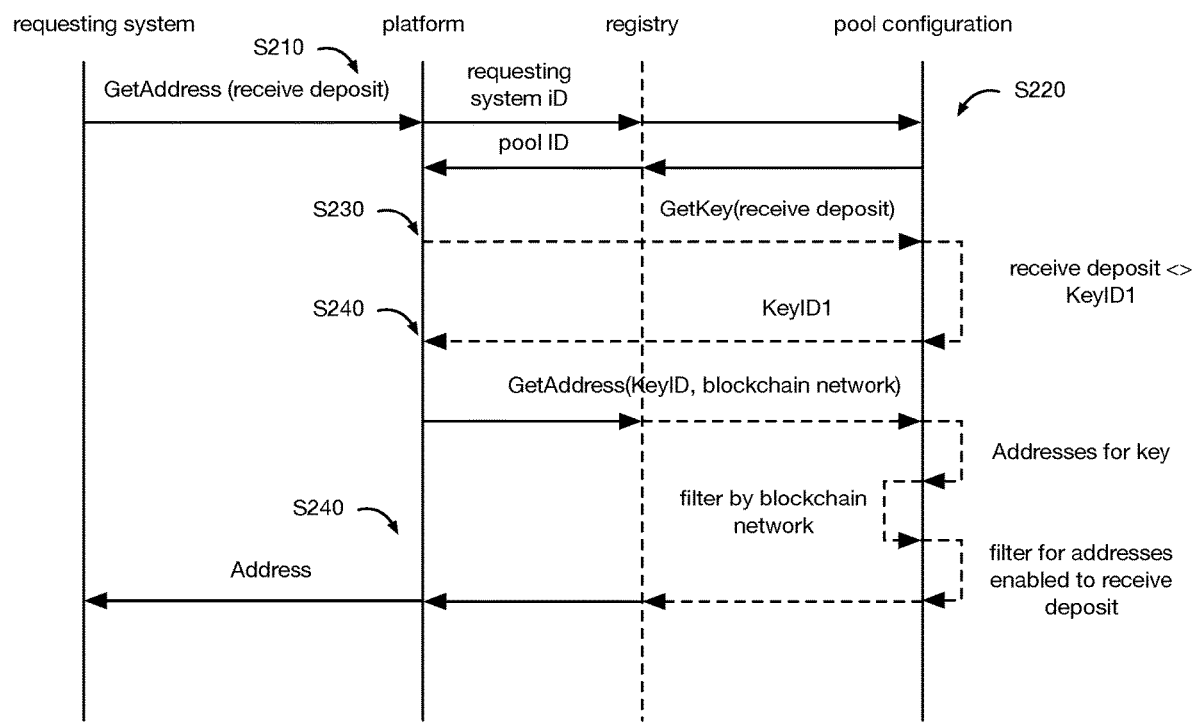
FIG. 15 is a schematic representation of an example of retrieving an address specified for a given blockchain functionality (e.g., receiving payments or deposits).
Figure 16:
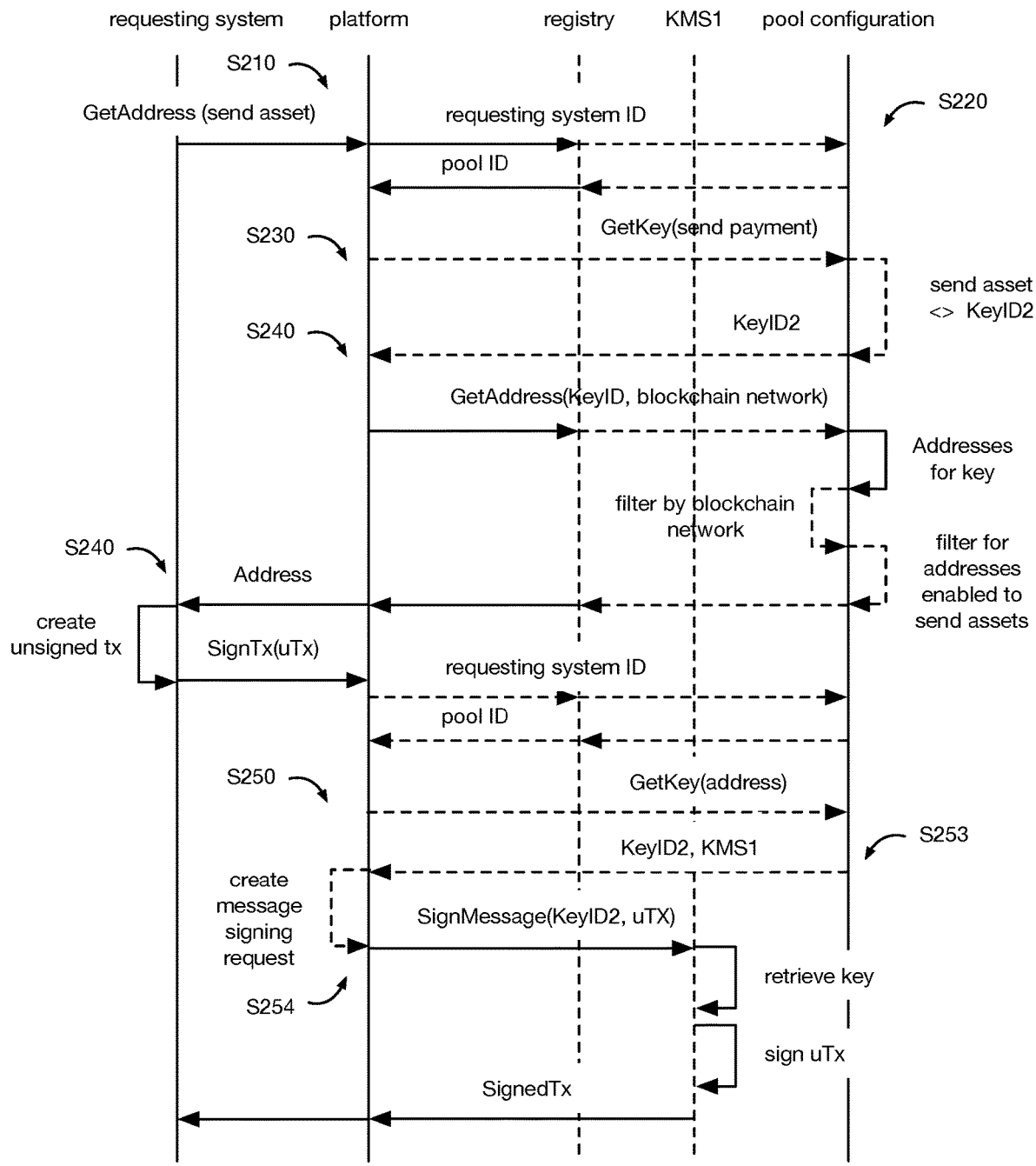
FIG. 16 is a schematic representation of an example of retrieving the key and associated address specified for on-chain sends and signing a transaction using the retrieved key.

In a second variant, determining the pool includes: determining the pools associated with the requesting system, optionally determining a set of pool parameters associated with the request, and optionally selecting the pool (from the set of pools associated with the requesting system) based on the pool parameters (examples shown in FIG. 15 and FIG. 16). The pools associated with the requesting system (e.g., the entity, the client) can be: pools initialized by the requesting system, pools that the requesting system is authorized to access (e.g., determined from a lookup table, from the registry, etc.), and/or other pools. The pool parameters can include: the requested functionality (e.g., wherein only pools with keys enabled for the requested functionality are returned), the request geography (e.g., determined from the request or request metadata, such as the requesting system's IP address; wherein only pools enabled for the request geography are returned), and/or other parameters.

In a third variant, the pool can be implicitly selected. For example, the pool can be the pool holding the key identified in the request.

However, the pool can be otherwise determined.

4.2.3 Key Selection.

The method can optionally include selecting a key from the pool S230, which functions to identify the correct key to use for the request. The key can be selected by the requesting system, by the platform, and/or by another system. The key can be selected based on information from the request, the use context, the identity of the requesting system, and/or based on any other suitable selection constraint. The key can be selected by evaluating the selection constraints against: the pool configuration (for the pool that the key belongs to), the key configuration, the associated addresses' configurations, the key parameters (e.g., history, balance, etc.), a lookup table, and/or other key information.

Figure 13:
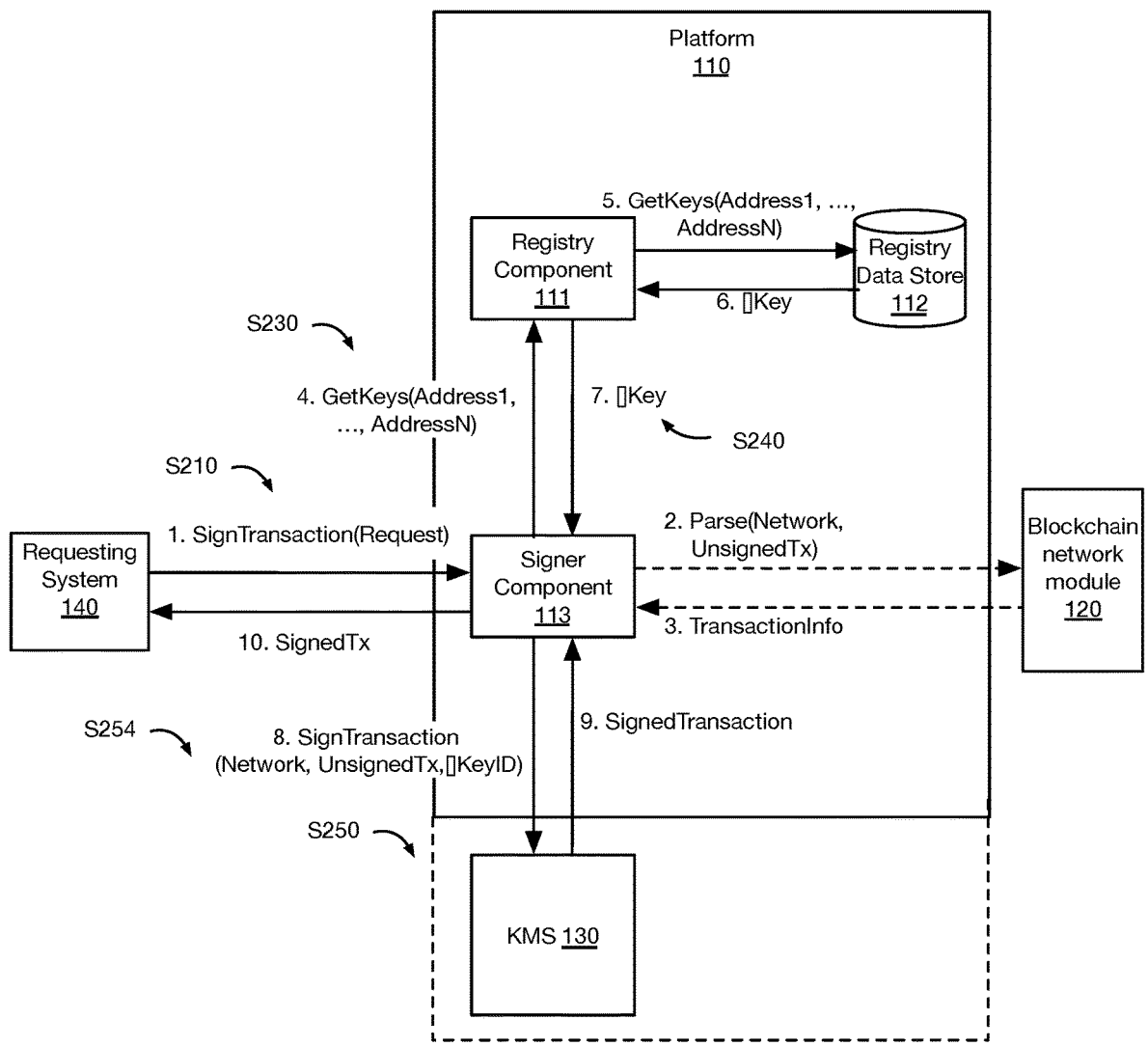
FIG. 13 is a schematic representation of an example of signing a blockchain transaction, in accordance with variations.
Figure 14:
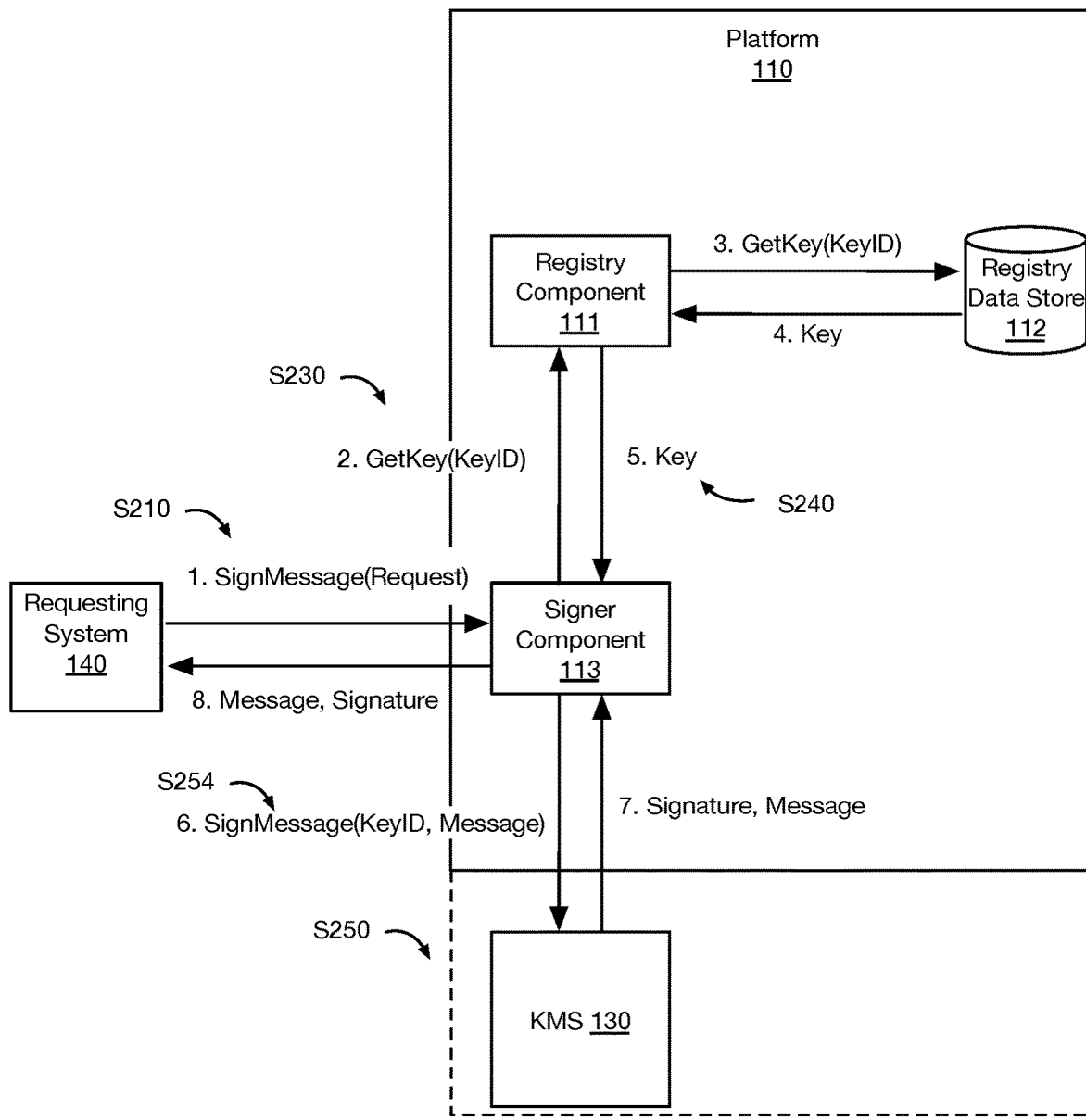
FIG. 14 is a schematic representation of an example of signing an arbitrary message, in accordance with variations.

In a first variant, the request includes a key identifier, wherein the key identified by the key identifier is selected (example shown in FIG. 14). In a second variant, the request is associated with a functionality (e.g., blockchain functionality), wherein the key within the pool that is associated with the functionality is selected (e.g., specified in the pool configuration; specified by a functionality-to-key mapping, etc.) (examples shown in FIG. 15 and FIG. 16). The functionality can be specified in the request, associated with the requesting system (e.g., wherein each client is associated with one or more functionalities, wherein each entity is authorized for a set of functionalities, etc.), determined from auxiliary information in the request (e.g., wherein a signing functionality can be inferred when the request payload includes an unsigned blockchain transaction), and/or otherwise determined. In a third variant, the selected key can be a key (within the pool) controlling an address for a blockchain network specified in the request (example shown in FIG. 13). In a fourth variant, the key can be selected based on a set of heuristics (e.g., key balance, risk, history of use, etc.), which can be particularly helpful when a pool includes multiple keys that satisfy the selection constraints, or when a requesting system has multiple pools with keys that satisfy the selection constraints. However, the keys can be otherwise selected.

4.2.4 Returning Information.

Returning information associated with the pool S240 functions to provide summary information, configuration values, addresses for a given functionality, key identifiers (e.g., for a given functionality), signed messages, and/or other information. The information is preferably returned by the platform (e.g., the registry, the pools component, etc.), but can additionally or alternatively be returned by the key store or KMS storing the key, a blockchain module (e.g., generating an address), a database, and/or by any other suitable system. The information can be returned to the requesting system, to a component within the platform, or to any other suitable endpoint. The information can be used to: initiate blockchain message or transaction signing, generate a blockchain transaction, monitor on-chain activities, and/or be otherwise used.

The information can include: pool information, key information, address information, signed blockchain messages (e.g., transactions, smart contract function calls, etc.), and/or other information.

The pool information can include: a pool identifier, the pool configuration, summary information (e.g., total number of keys in the pool, number of addresses per blockchain, etc.), pool history (e.g., key allocation history, address allocation history, pool use history, etc.), a list of the key identifiers associated with the pool, the addresses associated with the pool, a pool balance (e.g., aggregated across all addresses within the pool; for a cryptocurrency, for a set of cryptocurrencies, etc.), and/or other information. The pool configuration can include: access permissions (e.g., administrative whitelists or blacklists, requirements to implement an administrative change, etc.), functionality-key mapping, functionality-address mapping, the blockchain networks supported by the pool, the pool jurisdiction, and/or other parameters.

The key information is preferably for a single key, but can alternatively be for multiple keys. The key information can include: a key identifier, the public key, the pool that the key belongs to, the key configuration for a key, the key balance (e.g., aggregated across all addresses controlled by the key; specific to a cryptocurrency or generic; etc.), a list of all addresses controlled by the key, the number of addresses controlled by the key, the blockchain networks that the key can be used with, a key history, and/or other key information. The key configuration can include: the key curve, the key store or KMS storing the key, signing scheme(s) for key use, the functionalities enabled for the key, and/or other key configuration parameters.

The address information can include: the address itself, an address identifier, the identifier for the key controlling the address, the identifier for the pool that the address is part of, the address configuration, the address balance (e.g., on-chain balance; sum of sends to the address less sends from the address), the blockchain network(s) that the address can be used with, an address history, and/or other address information. The address configuration can include: the address curve, the blockchain network that the address is to be used for, the blockchain module that generated the address, the address generation parameters (used to generate the address), the functionalities enabled for the address, and/or other address configuration parameters.

Figure 7:
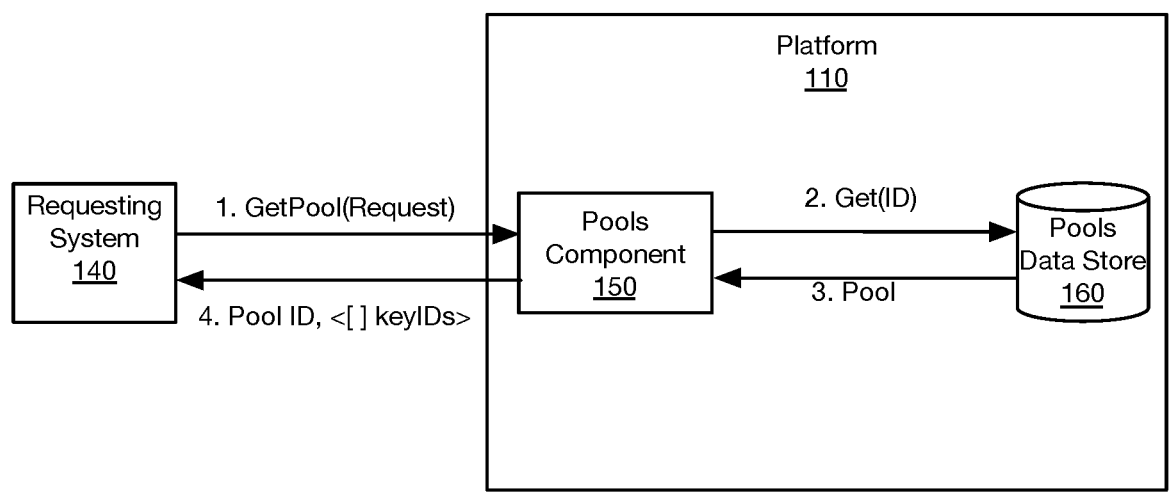
FIG. 7 is a schematic representation of an example of processing a pool information request.

In a first variation, the request is an information request, and values for the requested information are returned. For example, a predetermined set of pool information can be returned in response to receipt of a Get pool request (example shown in FIG. 7). In a second example, a list of key identifiers associated with a pool (e.g., key objects storing the pool identifier, key identifiers stored with a pool object, etc.) can be returned in response to receipt of a key request (example shown in FIG. 12). However, any other suitable information can be returned.

In a second variation, the request is a blockchain functionality request (e.g., blockchain interaction request, blockchain behavior request, etc.), wherein key or address information associated with (e.g., authorized for) the requested functionality are returned. The key or address information is preferably the identifier for the key or address selected above, but can alternatively be the key or address itself, be the public key, and/or be any other suitable information. In embodiments, this can function to enforce key usage policies, where the address or key identifier enabled for the requested functionality (e.g., as determined from the key usage policies and/or pool configuration) is returned. Each key can be enabled for a limited set of functionalities, all functionalities, and/or any other suitable set of functionalities. The functionalities for a key can be manually set, set by an administrator, automatically set, set based on the key-allocation requestor, set by the key allocation configuration, and/or otherwise specified.

When the address or key identifier is returned to a requesting system (e.g., external response), the requesting system can then make a second call to the system requesting functionality execution using the address or key identifier (example shown in FIG. 16).

When the address or key identifier is returned to the platform (e.g., internal response), the platform can automatically initiate functionality execution using the address or key identifier (example shown in FIG. 13). However, the returned information can be otherwise used.

In a first example of the second variation (example shown in FIG. 15), the requestor requests an address to receive deposits or payments for a given blockchain network (e.g., via a request specifying the receiving address), wherein the key(s) associated with the deposit functionality within the pool (associated with the requesting system) are selected, and the key's address(es) associated with the blockchain network can be returned.

In a second example, the request requests an address to send assets (e.g., payment) for a given blockchain network, wherein the key(s) within the pool (associated with the requesting system) that are associated with the send functionality are selected, and the key's address(es) associated with the blockchain network and optionally associated with the asset (e.g., the cryptocurrency) can be returned (example shown in FIG. 16).

In a third example, the request requests a delegation address for a given blockchain network, wherein the key(s) within the pool (associated with the requesting system) that are associated with the delegation functionality are selected, and the key's address(es) associated with the blockchain network and optionally the asset (e.g., the cryptocurrency) can be returned.

In a fourth example, the request requests an administrator address for a specific smart contract functionality, wherein the keys associated with the smart contract are selected and the addresses associated with the smart contract functionality (e.g., whitelisted by the smart contract for the functionality) is returned. In an illustrative example, the admin address for coin burning can be requested and returned.

In a fifth example, the request is a send request and includes an unsigned blockchain transaction, wherein an identifier for the key controlling the sending address (identified in the received blockchain transaction) is returned.

In a sixth example, the request is a delegation request and includes an unsigned blockchain message, wherein an identifier for the key controlling the sending address (e.g., identified in the delegation message) is returned.

However, any other suitable information can be returned.

4.2.5 Signing a Message.

Processing a blockchain request S200 can optionally include signing a message S250, which functions to sign a message with a segregated key that the client is authorized to use. The message is preferably a blockchain message, but can alternatively be a non-blockchain message or be any other suitable signing target. This allows signed messages to be generated, which in turn enables the requesting system to interact with the blockchain (e.g., enables execution of a blockchain functionality). The message is preferably signed based on the information returned above (e.g., a key identifier, a KMS system, etc.), but can alternatively be signed using information identified in a request, or using any other suitable information.

The message can be a blockchain transaction, a verification message (e.g., ownership verification), a staking transaction, an attestation (e.g., for an oracle), a smart contract function call, and/or any other suitable blockchain message. The blockchain message can require signatures for one or more blockchain addresses. In variants, all addresses requiring signing belong to the same pool. In some implementations, a signing request is rejected if it requires signing for addresses of different pools (e.g., wherein the system can perform the check before creating the unsigned messages and/or sending the unsigned messages to the respective key management systems). In other implementations, a signing request can be signed by keys from different pools (e.g., controlled by the same entity, controlled by different entities, etc.). In variants, the blockchain transaction can require multiple signatures using several signing systems or key management systems 130 (e.g., as specified by the KMS holding the key, by the key configuration, etc.). For example, some addresses identified in the blockchain transaction can require signing by using a threshold key management system 130, whereas other addresses can require signing by using a hot key key management system 130. However, the blockchain transaction can require a single signature (e.g., from a single key) or be otherwise verifiable. Signing can include signing by using one or more of a synchronous key management system, an asynchronous key management system, and/or other KMS.

Signing a message S250 can include: determining the message; determining a key identifier for a key associated with the message; determining the signing system(s) for message signing S253; and instructing the signing system to sign the message using the key S254 (examples shown in FIG. 13 and FIG. 14), wherein the signing system facilitates message signing (e.g., using the signing scheme for the signing system or KMS). The signed (or partially signed) message can be sent back to the client as part of a response. Partially signed messages can be additionally or alternatively be held by the key management system, held by the system, held by the client, or otherwise held until full signatures can be obtained.

S250 can be performed upon determination of a signing event or performed at any other suitable time. The signing event can include receipt of a signing request from a requesting system S210 (e.g., shown in FIG. 13); generation of an unsigned message; client authorization; timer expiration; and/or any other suitable event. A signing request can include one or more of: a blockchain network identifier; a message format identifier (e.g., transaction format); broadcast parameters (e.g., blockchain fees, broadcast time frame, etc.); a key identifier; a pool identifier; a blockchain address; the message to be signed; transaction information for transaction construction; and/or other information. A message format can include: an identifier for a message template (e.g., generic template, blockchain-specific template, etc.), describe a source of the unsigned transactions (e.g., the component, system, or application that generated the transaction), include metadata (e.g., for the blockchain message, etc.), a blockchain identifier, and/or include any other suitable information.

Determining the message functions to obtain an unsigned message for signing. The message can be: extracted from a request (e.g., received in S210); constructed (e.g., by a blockchain network module) based on request information (e.g., specifying the blockchain network; blockchain network fees or limits thereon; recipient address; message content, such as transaction amount or smart contract call; etc.); retrieved from a database; and/or otherwise determined.

When the message is received as part of a request, the message can optionally be analyzed by the respective blockchain network module to confirm that the message is valid for or compatible with the blockchain protocol. The message can optionally be analyzed to determine and/or interpret the content, determine the message format, and/or extract other data or metadata from the message.

When the message is constructed, the unsigned message can be constructed in any suitable manner. In a first example, the unsigned message can be constructed when an unsigned message (e.g., generated by a transaction service) is not received by the platform 110 as part of the signing request (e.g., shown in FIG. 13). The unsigned message can be constructed using information within the signing request (e.g., the address, amount, fees, nonces, blockchain network, specified blockchain network module, etc.), using automatically generated information (e.g., a serially incremented nonce), using a message format associated with the blockchain or key, and/or using any other suitable information.

In a second example, the unsigned message can be constructed by using an external component (e.g., a blockchain network module 120) that is separate from the platform 110. In this second example, the platform 110 can defer all the blockchain protocol specific functions (address derivation, address< >pubkey verification, transaction generation, transaction parsing, transaction combining, etc.) to this external component. However, the unsigned message can be otherwise determined.

Determining a key identifier for the key associated with the message functions to identify the private key that can sign the message with a valid signature, wherein the blockchain network verified the signature validity. The key is preferably determined using at least one of S220-S230, but can be looked up based on the message's address, extracted from the signing request, or otherwise determined. In a first variation, the key identifier is included in the signing request. In a second variation, the key is identified based on the address (e.g., from which funds are to be sent). In a third variation, the key is identified based on the pool that the client has access to. However, the key can be otherwise identified.

The client and/or message signing can be authorized based on the access permissions for the pool. This can include: determining the pool associated with the key (e.g., based on the pool identifier associated with the key, based on the key identifier, based on the address, based on the signing request); retrieving access permissions (e.g., the policies) associated with the pool, requestor, or other contextual parameter; and verifying client (e.g., requestor) access to the pool based on the access permissions or authorization policy (e.g., based on validity of access credentials, authentication methods, geolocation, etc.), wherein message signing is authorized after verification. Permissions can be granted for specific requests, for specific pools, for specific allocation configurations, for specific networks, for specific keys, or for specific addresses, or for any other suitable parameter. The signing request can be rejected if the client does not have access to the pool; however, the signing request can be otherwise managed.

In an illustrative example of message signing authorization, the platform can: receive a request including a transaction or message, the transaction or message format, and optionally the network (e.g., for a transaction). The transaction or message is parsed to determine the address(es) needed to sign the transaction or message, and the key(s) associated with said addresses are determined (e.g., looked up). The policy associated with the key is then evaluated to determine whether the key(s) is authorized to sign the transaction or message, based on the key and/or the context. For example, the policy can specify that signing is restricted to keys from a shared or single pool, or that signing is restricted to keys from a specified pool. The context can include: the requestor identity (e.g., the subject), the action (sign transaction, or sign message), the resources, the requestor geolocation, and/or other contextual parameters (e.g., request metadata). Examples of resources can include: the determined key(s), the pool(s) associated with the key(s), the network, the KMS system(s) associated with the key(s), the transaction format, and/or other resources. The message or transaction can be authorized for signing when the context satisfies or matches the policy (e.g., matches an allow rule, does not match a deny rule, etc.), or otherwise be authorized for signing. The policy can be a global policy, policy for a particular action, policy for a particular entity, or be any other policy. In an illustrative example, a policy can specify: for a requestor A and a transaction signing action, allow signing with keys associated with Pool A, deny signing with keys associated with Pool B, and use a cold storage KMS. A request from requestor A having the following context can be matched against the policy: subject: requestor A; action: sign_transaction; resources: key1—Pool A—network: bitcoin-mainnet—KMS: cold storage system1—format: bitcoin, key2—Pool B—network: bitcoin-mainnet—KMS: cold storage system1—format: bitcoin. In this example, the request is authorized because the request's context satisfies the policy's accept and deny rules.

Determining the signing system for message signing S253 functions to determine the signing backend and/or KMS to coordinate message signing. The signing backend is preferably determined based on the key information associated with the key (e.g., from the key configuration), but can alternatively be determined based on the pool information and/or any other suitable information.

Instructing the signing system to sign the message using the key S254 can include generating a signature request for the signing system identified in S253, (examples shown in FIG. 13, FIG. 14, and FIG. 16). The signature request can be constructed based on a template, the unsigned message, any key management system-specific information (e.g., from the signing request, automatically generated), a key identifier (e.g., for the KMS system, for the signing system, for the key store, etc.), and/or any other suitable information. The signing system can: retrieve the identified key (e.g., identified in S230), coordinate message signing according to the signing system's signing scheme (e.g., example shown in FIG. 3), and return the (entirely or partially) signed message.

The signed message can be: returned to the requesting system; broadcast to the relevant blockchain network (e.g., via a blockchain node for the blockchain network, via the blockchain network module for the blockchain network, via the requesting system, etc.); stored in association with the requesting system; and/or otherwise managed.

Message signing can be performed without user access to the key or the key identifier (e.g., wherein the key is automatically determined based on the pool identifier, the address, the requested functionality, the blockchain message, and/or other information). Alternatively, the key or key identifier can be provided to the user (e.g., the requesting system) at some point in the signing process or message construction process.

In an illustrative example, shown in FIG. 13, the platform 110 receives the signing request (wherein the signing request includes or identifies an unsigned transaction). The platform 110 parses the unsigned transaction. The platform 110 can parse the unsigned transaction by using a transaction parser specific to the blockchain network identified in the signing request. The transaction parser can be external to the platform 110. Alternatively, the transaction parser can be included in the platform. In an example, the blockchain network module 120 functions as the transaction parser for parsing the unsigned transaction. During the parsing of the unsigned transition, the platform 110 identifies addresses included in the unsigned transaction that require signatures (e.g., addresses included in a funds source field in a blockchain send transaction, etc.), and can optionally determine the paired payloads for signature. The platform 110 accesses the key information for each identified address, by using the registry data store 112.

The platform no and/or the signing system can obtain transaction signatures for each identified address. For each address, the platform no sends a transaction signing request (signature request) to the associated key management system 130, and receives a corresponding transaction signature. In variants, each transaction signing request sent by the platform 110 to a signing system 130 identifies at least one of: the unsigned transaction; a public key for the address requiring a signature; and at least one message signing parameter. Message signing parameters can include one or more of a blockchain network; a signature type; a curve, and the like.

In a case where the transaction requires a signature for multiple addresses, the platform 110 and/or the key management system collects all signatures, and assembles each signature into a signed transaction (that includes each signature). In some cases, signatures are created using multiple, different signing systems 130, and the platform 110 sends signing requests to each such signing system. In this variant, the platform 110 can: send each signed message back to the requesting system; combine the signatures before transmission to the client (e.g., combine partial signatures from different systems into a single signature), and/or otherwise manage multiple signatures. In variants, the platform no records transaction signing state which identifies which required signatures have been obtained, and which required signatures are still pending.

In a first variant, once all required signatures are obtained and assembled into a signed transaction, the platform 110 provides the signed transaction to the requesting system 140.

In a second variant, the platform 110 can provide the requesting system with an endpoint identifier used to retrieve the signed transaction. The platform can provide the requesting system 140 with the endpoint identifier before the transaction has been signed. In a first example, the requesting system 140 polls the endpoint identified by the endpoint identifier to detect completion of the signing, and retrieve the signed transaction. In a second example, the platform sends the requesting system 140 a notification once the transaction has been signed. In this manner, the platform 110 can provide a response to the requesting system's signing request in a timely manner, in cases where one or more of the key management systems is performing an asynchronous signing process (e.g., possibly requiring user input from a user operating user device that executes a secure signing enclave).

The requesting system 140 can then broadcast the signed transaction to the blockchain network. Alternatively, the platform 110 or another component can interact with the blockchain.

In variants, auditing can be performed (e.g., by the platform 110) to log all requests received by the platform 110 (and optionally all responses provided by the platform to requesting systems).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A custodial cryptocurrency platform for facilitating message signing using different signing systems for different stored keys via pool objects, the custodial cryptocurrency platform comprising:
   signing systems comprising a first signing system corresponding to a first signing scheme associated with a hot storage system and a second signing system corresponding to a second signing scheme associated with a cold storage system; and one or more processors programmed with instructions that, when executed by the one or more processors, cause operations comprising:

storing a key collection of message signing private keys via different storage schemes comprising a hot storage scheme and a cold storage scheme, wherein a first portion of the key collection is stored in the hot storage system via the hot storage scheme, and a second portion of the key collection is stored in the cold storage system via the cold storage scheme;

storing, in one or more databases, a set of pool objects associated with pools, wherein each pool object of the set of pool objects is allocated a set of private keys of the key collection and indicates a blockchain functionality for each key of the set of private keys, the set of pool objects comprising (i) a first pool object being allocated a first plurality of private keys of the key collection that are each associated with a different blockchain functionality than at least one other blockchain functionality associated with another key of the first plurality of private keys and (ii) a second pool object being allocated a second plurality of private keys of the key collection that are each associated with a different blockchain functionality than at least one other blockchain functionality associated with another key of the second plurality of private keys;

in response to obtaining a request to sign a message for a blockchain, identifying pool objects and private keys for signing the message that are respectively allocated to the pool objects, wherein the pool objects and the private keys are identified using (i) parameters of the request and (ii) pool configurations of one or more pools associated with the private keys, the private keys comprising a first private key allocated to the first pool object having the first plurality of message signing keys and a second private key allocated to the second pool object having the second plurality of message signing keys;

identifying, based on the first and second pool objects, the first signing scheme for the first private key allocated to the first pool object and the second signing scheme for the second private key allocated to the second pool object, the second signing scheme being different from the first signing scheme;

invoking, based on the first and second signing schemes for the first and second private keys, (i) the first signing system to generate a first signature for the message with the first private key via the hot storage system and (ii) the second signing system to generate a second signature for the message with the second private key via the cold storage system; and using the first signature and the second signature to generate a multi-signature message indicating authorization by the one or more pools for the request, wherein, subsequent to the generation of the multi-signature message, the multi-signature message is recorded on the blockchain.

2. The cryptocurrency platform of claim 1, the operations further comprising:

determining, based on the parameters of the request, first and second pools respectively associated with the first and second pool objects, the parameters comprising a first parameter indicating the first pool and a second parameter indicating the second pool different from the first pool, wherein invoking the first and second signing systems comprises invoking, based on the determination of the first and second pools, the first signing system to generate the first signature for the message with the first private key and the second signing system to generate the second signature for the message with the second private key, and wherein the first private key is configured to be limited to use for signing messages for the first pool, and the second private key is configured to be limited to use for signing messages for the second pool.

3. The cryptocurrency platform of claim 1, the operations further comprising:

determining, based on the parameters of the request, one or more first blockchain functionalities and one or more second blockchain functionalities different from the one or more first blockchain functionalities, the parameters comprising a first parameter indicating a first blockchain functionality and a second parameter indicating a second blockchain functionality different from the first blockchain functionality, wherein invoking the first and second signing systems comprises invoking, based on the determination of the first and second blockchain functionalities, the first signing system to generate the first signature for the message with the first private key and the second signing system to generate the second signature for the message with the second private key, and wherein the first private key is configured to be limited to use for the one or more first blockchain functionalities, and the second private key is configured to be limited to use for the one or more second blockchain functionalities.

4. The cryptocurrency platform of claim 1, wherein the first private key is associated with a first functionality subset comprising a first one of sending, receiving, staking, or smart contract interaction, and the second private key is associated with a second functionality subset that does not comprise the first one of sending, receiving, staking, or smart contract interaction.

5. The cryptocurrency platform of claim 1, the operations further comprising:

transmitting the multi-signature message to a requesting system as a response to the request, wherein, subsequent to the transmission of the multi-signature message, the multi-signature message is recorded on the blockchain.

6. The cryptocurrency platform of claim 1, the operations further comprising:

submitting the multi-signature message to the blockchain, wherein, subsequent to the submission of the multi-signature message, the multi-signature message is recorded on the blockchain.

7. A method comprising:

storing a collection of private keys, the collection comprising a first portion stored in a hot storage system via a hot storage scheme and a second portion stored in a cold storage system via a cold storage scheme;

storing, in one or more databases, a set of pool objects associated with pools, wherein each pool object of the set of pool objects is allocated a set of private keys of the collection, the set of pool objects comprising (i) a first pool object being allocated a first plurality of private keys of the collection that are each associated with a different blockchain functionality than at least one other blockchain functionality associated with another key of the first plurality of private keys and (ii)

a second pool object being allocated a second plurality of private keys of the collection that are each associated with a different blockchain functionality than at least one other blockchain functionality associated with another key of the second plurality of private keys;

in response to obtaining a request to sign a message for a blockchain, identifying pool objects and private keys for signing the message that are respectively allocated to the pool objects, wherein the pool objects and the private keys are identified using (i) parameters of the request and (ii) pool configurations of one or more pools associated with the private keys, the private keys comprising a first private key allocated to the first pool object and a second private key allocated to the second pool object;

identifying, based on the first and second pool objects, a first signing scheme for the first private key allocated to the first pool object and a second signing scheme for the second private key allocated to the second pool object, the second signing scheme being different from the first signing scheme;

invoking, based on the first and second signing schemes for the first and second private keys, (i) a first signing system to generate a first signature for the message with the first private key allocated to the first pool object and (ii) a second signing system to generate a second signature for the message with the second private key allocated to the second pool object; and using the first signature and the second signature to generate a multi-signature message indicating authorization by the one or more pools for the request, wherein, subsequent to the generation of the multi-signature message, the multi-signature message is recorded on the blockchain.

8. The method of claim 7, further comprising:
determining, based on the parameters of the request, one or more first functionalities related to the first pool object,
wherein invoking the first signing system comprises invoking, based on the determination of the one or more first functionalities, the first signing system to generate the first signature for the message with the first private key, and
wherein the first private key is configured to be limited to use for the one or more first functionalities, the one or more first functionalities being different from one or more other functionalities related to the first pool object that are associated with one or more other keys.

9. The method of claim 8, wherein the second private key is associated with one or more second functionalities different from the one or more first functionalities.

10. The method of claim 7, wherein the first private key is associated with a first functionality subset comprising a first one of sending cryptocurrency, receiving cryptocurrency, staking cryptocurrency, or smart contract interaction, and the second private key is associated with a second functionality subset that does not comprise the first one of sending cryptocurrency, receiving cryptocurrency, staking cryptocurrency, or smart contract interaction.

11. The method of claim 7, further comprising:
transmitting the first and second signatures to a requesting system as a response to the request,
wherein, subsequent to the transmission of the first and second signatures, the multi-signature message is recorded on the blockchain.

12. The method of claim 7, further comprising:
transmitting the multi-signature message to a requesting system as a response to the request,
wherein, subsequent to the transmission of the multi-signature message, the multi-signature message is recorded on the blockchain.

13. The method of claim 7, further comprising:
submitting the multi-signature message to the blockchain,
wherein, subsequent to the submission of the multi-signature message, the multi-signature message is recorded on the blockchain.

14. A non-transitory computer-readable media storing instructions that, when executed by one or more processors, cause operations comprising:
storing a collection of private keys, the collection comprising a first portion stored in a hot storage system via a hot storage scheme and a second portion stored in a cold storage system via a cold storage scheme;
storing, in one or more databases, a set of pool objects associated with pools, wherein each pool object of the set of pool objects is allocated a set of private keys of the collection and indicates blockchain functionalities for keys of the set of private keys, the set of pool objects comprising (i) a first pool object being allocated a first plurality of private keys of the collection that are each associated with a different blockchain functionality than at least one other blockchain functionality associated with another key of the first plurality of private keys and (ii) a second pool object being allocated a second plurality of private keys of the collection that are each associated with a different blockchain functionality than at least one other blockchain functionality associated with another key of the second plurality of private keys;
in response to obtaining a request to sign a message for a blockchain, identifying pool objects and private keys for signing the message that are respectively allocated to the pool objects, wherein the pool objects and the private keys are identified using (i) parameters of the request and (ii) pool configurations of one or more pools associated with the private keys, the private keys comprising a first private key allocated to the first pool object and a second private key allocated to the second pool object, wherein identifying the private keys comprises:
selecting, from the first plurality of private keys allocated to the first pool object, the first private key over one or more other keys of the first plurality of private keys based on (i) the first private key being associated with a first blockchain functionality and not associated with a second blockchain functionality and (ii) at least one parameter of the request indicating the first blockchain functionality; and
selecting, from the second plurality of private keys allocated to the second pool object, the second private key over one or more other keys of the second plurality of private keys based on (i) the second private key being associated with the second blockchain functionality and (ii) and at least one parameter of the request indicating the second blockchain functionality;
identifying, based on the first and second pool objects, a first signing scheme for the first private key allocated to the first pool object having the first plurality of private keys and a second signing scheme for the second private key allocated to the second pool object, the second signing scheme being different from the first signing scheme;

invoking, based on the first and second signing schemes for the first and second private keys, (i) a first signing system to generate a first signature for the message with the first private key allocated to the first pool object having the first plurality of private keys and (ii) a second signing system to generate a second signature for the message with the second private key allocated to the second pool object; and using the first signature and the second signature to generate a multi-signature message indicating authorization by the one or more pools for the request, wherein, subsequent to the generation of the multi-signature message, the multi-signature message is recorded on the blockchain.

15. The non-transitory computer-readable media of claim 14, the operations further comprising:

determining, based on the parameters of the request, a first pool associated with the first private key, wherein invoking the first signing system comprises invoking, based on the determination of the first pool, the first signing system to generate the first signature for the message with the first private key, and wherein the first private key is configured to be limited to use for signing messages for the first pool.

16. The non-transitory computer-readable media of claim 15, wherein the first private key is configured to be limited to use for signing messages for the first pool, and the second private key is configured to be limited to use for signing messages for the second pool.

17. The non-transitory computer-readable media of claim 14, wherein the first private key is associated with a first functionality subset comprising a first one of sending cryptocurrency, receiving cryptocurrency, staking cryptocurrency, or smart contract interaction, and the second private key is associated with a second functionality subset that does not comprise the first one of sending cryptocurrency, receiving cryptocurrency, staking cryptocurrency, or smart contract interaction.

18. The non-transitory computer-readable media of claim 14, the operations further comprising:

transmitting the first and second signatures to a requesting system as a response to the request, wherein, subsequent to the transmission of the first and second signatures, the multi-signature message is recorded on the blockchain.

19. The non-transitory computer-readable media of claim 14, the operations further comprising:

transmitting the multi-signature message to a requesting system as a response to the request, wherein, subsequent to the transmission of the multi-signature message, the multi-signature message is recorded on the blockchain.

20. The non-transitory computer-readable media of claim 14, the operations further comprising:

submitting the multi-signature message to the blockchain, wherein, subsequent to the submission of the multi-signature message, the multi-signature message is recorded on the blockchain.

* * * * *